United States Patent [19]

Roy

[11] Patent Number: 4,615,667
[45] Date of Patent: Oct. 7, 1986

[54] INJECTION BLOW MOLDING

[76] Inventor: Siegfried S. Roy, 34 Nathan Lord Rd., Amherst, N.H. 03031

[21] Appl. No.: 740,893

[22] Filed: Jun. 3, 1985

Related U.S. Application Data

[63] Continuation-in-part of Ser. No. 560,592, Dec. 12, 1983, abandoned, which is a continuation-in-part of Ser. No. 367,467, Apr. 12, 1982, abandoned.

[51] Int. Cl.[4] .................... B29C 49/06; B29C 49/62; B29C 49/64
[52] U.S. Cl. .................................... 425/135; 264/526; 264/528; 264/531; 264/532; 264/538; 425/150; 425/525; 425/526; 425/533; 425/537
[58] Field of Search .............. 425/525, 526, 533, 537, 425/135, 150; 264/531, 537, 538, 526, 528, 532

[56] References Cited

U.S. PATENT DOCUMENTS

| | | |
|---|---|---|
| 3,048,889 | 8/1962 | Fischer et al. |
| 3,170,971 | 2/1965 | Ninneman et al. |
| 3,244,778 | 4/1966 | Ninneman . |
| 3,280,236 | 10/1966 | Ninneman et al. |
| 3,337,910 | 8/1967 | West . |
| 3,339,231 | 9/1967 | Piotrowski . |
| 3,412,186 | 11/1967 | Piotrowski . |
| 3,412,188 | 11/1968 | Seekluth . |
| 3,664,798 | 5/1972 | Moslo . |
| 3,776,991 | 12/1973 | Marcus . |
| 3,842,149 | 10/1974 | Vollers . |
| 3,868,202 | 2/1975 | Valyi . |
| 3,887,316 | 6/1975 | Hestehave ................ 425/533 X |
| 3,941,539 | 3/1976 | Saumsiegle et al. .......... 425/533 X |
| 4,019,849 | 4/1977 | Farrell . |
| 4,295,811 | 10/1981 | Sauer . |
| 4,414,175 | 11/1983 | Rainville ....................... 264/537 X |

FOREIGN PATENT DOCUMENTS

| | | |
|---|---|---|
| 1936952 | 4/1979 | Fed. Rep. of Germany . |
| 7426416 | 7/1974 | France . |
| 47-34827 | 9/1972 | Japan . |
| 1033019 | 9/1965 | United Kingdom . |
| 1507552 | 4/1978 | United Kingdom . |
| 2022007 | 12/1979 | United Kingdom . |

Primary Examiner—Jan Silbaugh
Attorney, Agent, or Firm—John T. Synnestvedt; Kenneth P. Synnestvedt

[57] ABSTRACT

The present invention provides a multiple platen-multiple position press or injection blow molding apparatus for use in the blow molding of containers in which a preform is molded onto a core and is moved relative to the core to space a body portion of the preform from the core when the core is in the blowing station to facilitate the temperature conditioning of the preform to achieve a desired biorientation of the thermoplastic material from which the preform is made when the preform is blow molded to form a container. The temperature conditioning may be achieved by allowing stabilization of the temperature gradient through the material of the preform with or without the assistance of a supply of gas to the preform at a desired temperature.

33 Claims, 28 Drawing Figures

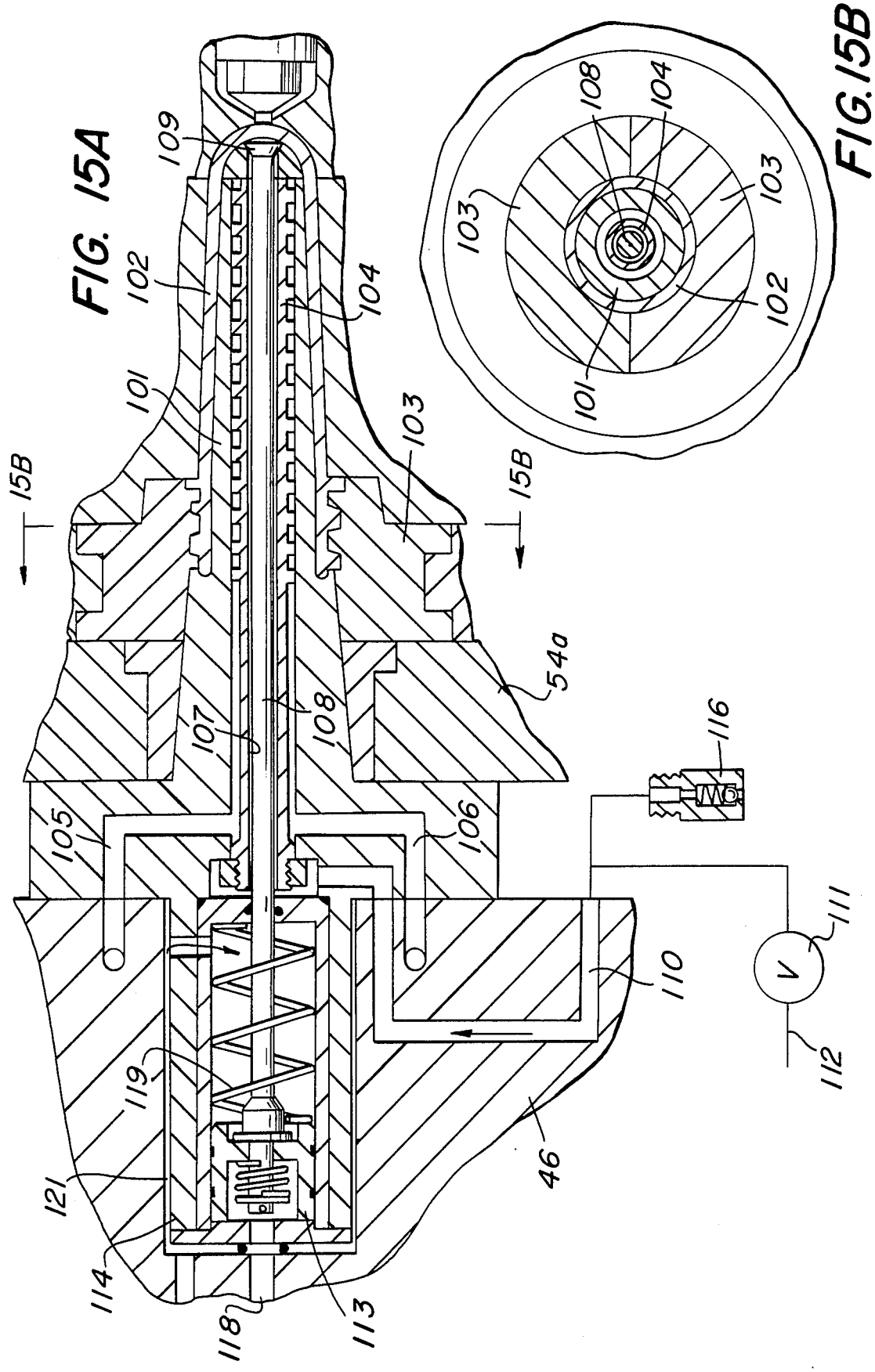

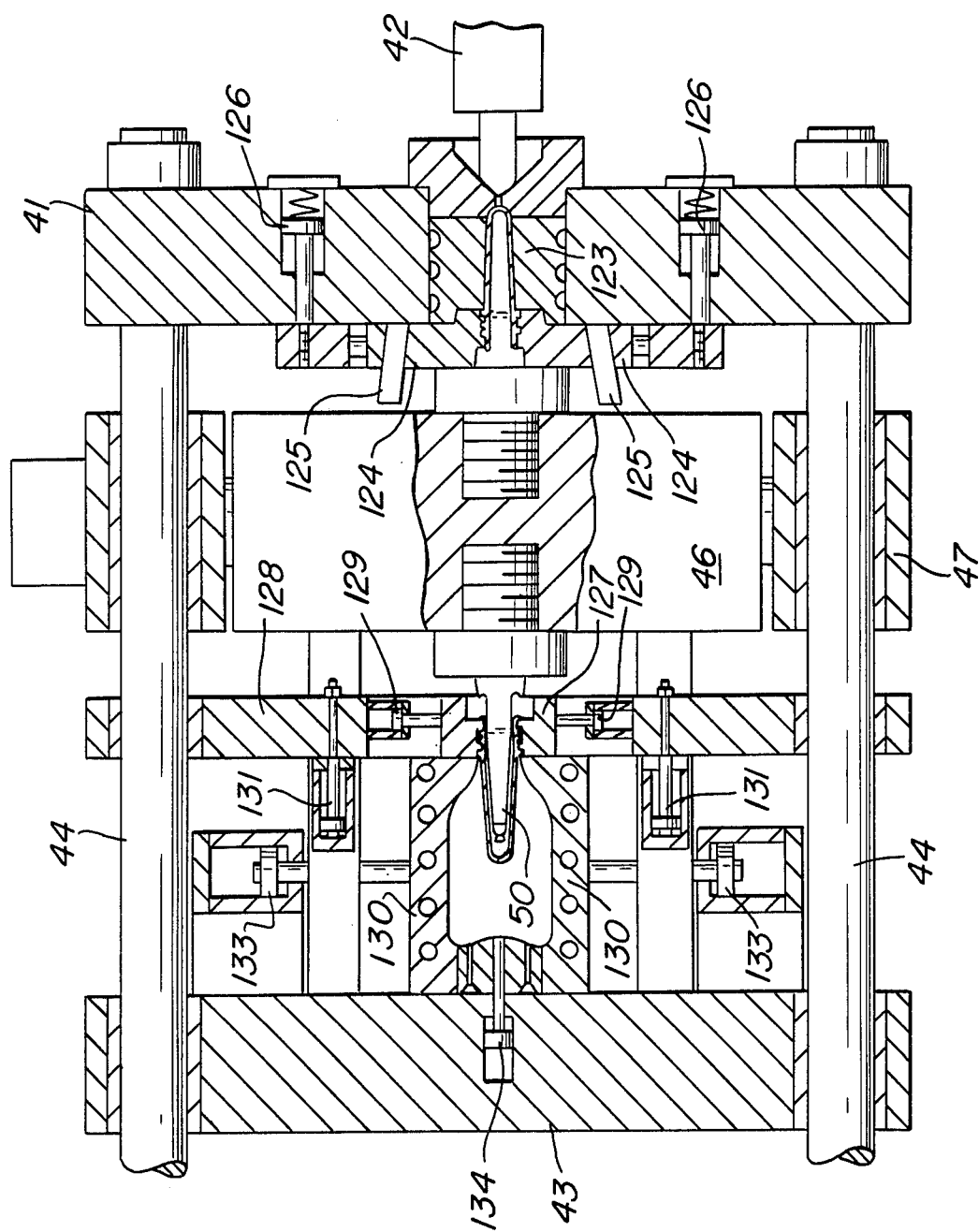

ic="4,615,667"-->

INJECTION BLOW MOLDING

CROSS REFERENCES

The present application is a continuation-in-part of U.S. application Ser. No. 560,592, filed Dec. 12, 1983, now abandoned which in turn is a continuation-in-part of U.S. application Ser. No. 367,467, filed Apr. 12, 1982, now abandoned.

TABLE OF CONTENTS OF SPECIFICATION

CROSS REFERENCES
BACKGROUND AND STATEMENT OF OBJECTS
BRIEF DESCRIPTION OF DRAWINGS
  FIGS. 1 to 3
  FIGS. 4 to 9
  FIGS. 10 to 14
  FIGS. 15 to 18
  FIGS. 19 to 22
DETAILED DESCRIPTION OF DRAWINGS
  FIGS. 1, 2 and 3
  FIGS. 4 to 9
  FIGS. 10 and 11
  FIG. 12
Operating Features of FIGS. 1 to 12
FIG. 13 and Operating Features
FIG. 14 and Operating Features
FIGS. 15 to 18A and Operating Features
FIGS. 19 to 22 and Operating Features

BACKGROUND AND STATEMENT OF OBJECTS

The present invention relates to methods and apparatus for manufacturing hollow articles of thermoplastic material, for example, polyester, polypropylene, polyvinyl chloride, nylon, from injection molded or compression molded preforms which are inflated in their softened state until they take the shape of the desired articles.

Typical examples of the prior art are U.S. Pat. Nos. 3,048,889, 3,339,231, 3,412,186, 3,664,798, 3,776,991, 3,842,149 and 4,295,811. In addition, attention is drawn to a typical modern injection blow molding machine disclosed in Sumitamo Heavy Industries, Ltd.'s brochure M202 E 81 entitled Nepiomat 30/120, 330/150.

It is known in the prior art to effect such a process by pressing the edge of a preform in the softened condition onto the neck of a hollow blow mold which has the shape of the desired article. The preform is then blown or inflated in the softened condition within this mold, starting from the edge thereof, until it completely touches the entire interior of the blow mold, and on contact with this wall, the distended preform cools instantaneously, thereby permanently assuming the shape of the mold, i.e., the desired article.

By the term "softened" state, or condition, or phase, is meant the state of the material intermediate the rigid and fluid states, a state in which the material can be mechanically worked without rupturing, for example, a state in which the material is capable of being expanded by blowing. Both thermoplastic and thermoset plastics are capable of entering the "softened" phase. As to thermoplastics, they typically enter the softened state upon being heated and reenter the hard or rigid state upon being cooled, and are capable of thus cycling between the softened and rigid states a number of times. In contrast, thermoset resins typically pass through this "softened" phase only once, immediately after initial formation, and thereafter, they irreversibly set in the rigid condition.

In such blow molding operations, for high mechanical strength properties of the blown container (such as impact and stress resistance), it is of great importance with certain resins that a high level of biorientation of the resin of the container be achieved. This requires close temperature control of the resin of the preform.

For reasons of production speed and in order to prevent the soft preform from being left supporting its own weight between the injection and blowing phases of the process, the blowing head is generally incorporated in the core upon which the preform or parison is formed. The core containing this blowing head is then conveyed to the entrance of the blow mold.

In the injection blow molding apparatus presently being used, such as the Piotrowski system disclosed in Piotrowski U.S. Pat. Nos. 3,339,231 and 3,412,186 above referred to, in which the preform remains with the core and is transferred to the blow station to make a container, controlled temperature conditioning, which is essential for obtaining optimum biorientation levels in the finally blown container, is difficult to predict or achieve, especially in the following situations:

a. When the preform has a thickness from about 1–5 mm, for example, 2.5 mm, the final blown container can have a wall thickness of about 0.25 mm or less. This is especially so when the blow ratio between the preform wall and the blown container is fairly high, such as 10 to 1, which is preferred for high biorientation levels with some resins.

b. When using certain resins, such as polyester teraphthalate, polypropylene, polyvinyl chloride, nylon, etc., the temperature is very difficult to control on a predictable basis in present injection blow mold equipment in which the core travels with the preform to the blow station. These resins, in their hot softened state or at their optimum biorientation blowing temperatures, tend to adhere or stick unpredictably to parts of the metal core when blow air is introduced for blowing the container. This condition causes poor material distribution in the walls of the container, and in extreme cases, folds, blowouts, pleats and other distortions.

c. In the manufacture of consistently controlled bioriented containers for use as pressure vessels, i.e., beverage, beer and other carbonated drinks, made from polyester teraphthalate bioriented containers, orientation levels in the walls of the containers have to be predictable and consistent, and this can only be accomplished by fairly precise control of the preform temperature at the time it is blown to form the container. This predictability in control is presently not readily and consistently available on equipment being used in the marketplace.

In present injection blow molding apparatus, temperature control of the cross section of the preform wall is difficult to achieve. The core which is carrying cooling fluid tends to overcool the inner layer of the preform which is in direct contact with the core. The outer layer of plastic of the preform does not cool at the same rate and cools partly by convection to ambient air. The only primary cooling that the outer layer gets is when it is stationary in the injection cavity. Heat transmission from the outer layer of the preform to the core is slow due to the poor heat transfer characteristics of plastics in general. This condition causes the temperature gradient through the cross section of the preform wall to be very steep, especially in thicker preforms which are required for high blow ratios. High blow ratios are required to obtain high biorientation levels in the blown container walls.

To get maximum utilization of plastic in a container, it is necessary to maximize the mechanical properties of the walls of the container through biorientation at the optimum orientation temperature for the particular resin being used.

The part of the cross section of the preform which is nearest to optimum orienting temperature develops the best mechanical properties when blown into a container. Consequently, the portions of the plastic in the preform in higher and lower temperature bands tend to have unsatisfactory properties.

The process temperature window for optimum orientation levels in orientable resins is fairly small. In view of this, in order to obtain the best results, the entire cross section of that portion of the preform that needs to have optimum mechanical properties should be as close as possible to the precise bioriening temperature at the time it is blown. There should be a minimum and, ideally, no temperature gradient.

It is an object of the present invention to control the temperature conditioning of preforms and to achieve this with an economically effective production system.

The present invention provides a hollow preform of plastic material for the blow molding of a container comprising an open end portion, a hollow body portion and an end closure, said open end portion having an inner surface defining an opening of constant cross section and said body portion having an interior surface defining an opening extending from the opening of said open end portion with an ever decreasing cross section to said end closure.

The present invention also provides apparatus for the blow molding of containers comprising a core for supporting a thermoplastic preform during molding thereof and for supplying fluid to the interior of the preform for blow molding thereof, said core having a sealing portion of constant cross section and a body portion extending from the cylindrical portion with an ever decreasing cross section to a core end portion.

The apparatus preferably also comprises a split clamp means adapted to clamp a preform open end portion in sealing contact with said constant cross section sealing portion, said clamp means and said core being adapted for relative movement to space a portion of a preform, when on the core, from said core while said sealing contact is maintained.

The apparatus further includes an injection blow molding press including injection molding and blowing stations and having a fixed platen, a movable platen and a turret for mounting the preform core, with a neck ring split or clamping means arranged to shift the position of the preform with respect to the preform core in different positions of the press in order to make possible improved temperature conditioning and control of the preform. This provides for accuracy of biorientation temperature control, notwithstanding shifting movement of the core between injection and blowing stations.

The apparatus of the invention is also adapted to the use of a multiplicity of cores sequentially brought into cooperation with the preform injection and blow molding stations, thereby providing automatically for the carrying out of the following steps:

a. molding a preform onto a core, said preform having an open end portion disposed in sealing engagement with a surface of constant cross section on said core, and a hollow body portion having a closed end;
 b. moving said preform and said core relative to one another to space said body portion from said core while maintaining said sealing contact;
 c. achieving a desired temperature condition of said preform, while spaced from said core, for blow molding to produce a bioriented thermoplastic container; and
 d. blow molding the temperature conditioned preform to produce said container.

It is also an object of this invention to improve the distribution of the material in the walls of the hollow containers being blown, this being accomplished according to the present invention by the employment of an element, herein referred to as a stretch rod, mounted in the core and arranged for projection from the tip of the core to the bottom of the preform and of the article as it is being blown, thereby guiding the bottom wall of the container during the blowing operation.

In arrangements of the invention employing the stretch rod, the stretch rod is also associated with a valve in the passage through which air may be introduced into the preform, such valve providing not only for introduction of air to diminish the tendency for a vacuum to develop causing distribution of the preform on the core when the preform is shifted on the core, but also to subsequently introduce the blowing air, to effect blow molding of the article.

BRIEF DESCRIPTION OF DRAWINGS

Apparatus according to the present invention will now be described, by way of example, with reference to the accompanying drawings, in which:

FIGS. 1 to 3 are somewhat diagrammatic views illustrating a preform and certain components, as follows:

FIG. 1 is an elevation of a preform shown sectioned on one side of its longitudinal axis;

FIG. 2 is a fragmentary elevation of a core, with the preform of FIG. 1 shown in fragmentary section, with its body portion spaced from the core and its neck portion in sealing contact with the core;

FIG. 3 is a fragmentary sectional elevation of the core of FIG. 2.

FIGS. 4 to 9 illustrate an injection blow molding machine of the type having a plurality of preform cores and neck split means which move with each core between the injection and the blowing stations and illustrating the following conditions:

FIG. 4 is a diagrammatic part sectional elevation of an injection blow molding machine with the injection molding of a first preform completed on the core at station A and the cooling of a second preform taking place on the core at station B;

FIG. 5 is the fragmentary sectional elevation of the machine of FIG. 4, with the second preform spaced from the core at station B for temperature conditioning thereof to a temperature at which desired biorientation of the material thereof will occur upon stretching of this material by blow molding;

FIG. 6 is a fragmentary sectional elevation of the machine of FIG. 4 with the second preform blown to full form at the orienting temperature;

FIG. 7 is a fragmentary sectional elevation of the machine of FIG. 4 preparatory to opening the blow mold;

FIG. 8 is a fragmentary sectional elevation of the machine of FIG. 4, with the blow mold open and the container blow molded from the second preform in the process of ejection;

FIG. 9 is a fragmentary sectional elevation of the machine of FIG. 4, with blow and injection molds fully open and immediately before the first preform has been transferred to the blow molding station B preparatory to the closing of the blow and injection molds for the injection molding of another preform thereby to reach the operational condition of the machine as shown in FIG. 4.

FIGS. 10 to 14 illustrate various alternative arrangements of various of the features shown in FIGS. 1 to 9, as follows:

FIG. 10 is an elevation of multi-cavity injection blow molding apparatus incorporating the features illustrated diagrammatically in the machine of FIGS. 4 to 9, shown in the fully open position of the blow and injection mold assemblies;

FIG. 11 is a diagrammatic illustration of the temperature control system of the machine of FIG. 10;

FIG. 12 is a diagrammatic representation of a four-station alternative embodiment to the two-stage embodiment illustrated with reference to FIGS. 4 through 11;

FIG. 13 is a somewhat diagrammatic view of another embodiment of a blow mold which may be used in the apparatus of the invention, this view illustrating an arrangement for introducing air for temperature control, and also illustrating an arrangement for ejection of a blown article; and FIG. 14 is a view similar to FIG. 13 but illustrating still another embodiment of temperature control and ejection equipment contemplated by the invention.

FIGS. 15 to 18A illustrate in greater detail equipment incorporating the features of the press mechanism of FIGS. 4 to 9 in which a neck split moves with the core and preform from the injection molding station to the blow molding station, this embodiment incorporating what is herein referred to as a stretch rod for increasing accuracy in the blowing operation, the individual figures of this group illustrating different phases of the operation of the equipment as follows:

FIG. 15 is a fragmentary longitudinal sectional view through the injection molding station and illustrating the core and associated parts in outline and also showing certain of the operating parts for the neck split mechanism;

FIG. 15A is an enlarged sectional view of the core of FIG. 15 and showing various of the parts associated with the core;

FIG. 15B is a transverse sectional view through the core and neck split means, taken as indicated by the section line 15B—15B on FIG. 15A;

FIG. 16 is a view similar to FIG. 15 but showing the core in the blow molding station and further showing the displacement of the neck split and thus of the preform with respect to the core and illustrating the position of certain parts associated with the stretch rod in order to avoid development of a vacuum in the space between the core and preform;

FIG. 17 is a view similar to FIG. 16A but illustrating a different position of the stretch rod and connected parts;

FIG. 18 is a view similar to FIG. 16, but illustrating the position of these parts as the blowing of the container is being completed; and FIG. 18A is an enlarged sectional view of the core and associated parts in the position of FIG. 18.

FIGS. 19 to 22

FIGS. 19 to 22 illustrate a multiple station press generally similar to FIGS. 4 to 9, but showing an arrangement according to the invention in which one neck split means remains at the injection molding station and a separate neck split means is located and used in the blow molding station, the several views of this group showing both stations, with the positions of various of the parts in both stations, as follows:

FIG. 19 is a view of the multiple core and multiple station press mechanism, but showing separate neck ring splits at the injection and blowing stations, both of the splits being shown in engagement with the preforms on the cores;

FIG. 19b is a fragmentary sectional view taken as indicated by the section line 19b—19b on FIG. 19a;

FIG. 20 is a view similar to FIG. 19 but illustrating the advanced position of the neck split in the blowing station providing for spacing of the preform from the core;

FIG. 21 is a view similar to FIG. 20 but illustrating the position of parts including the stretch rod at the time of completion of the blow molding operation; and FIG. 22 is a view of the mechanism of FIGS. 19 to 21 but showing the press members separated and showing also the blow mold open after completion of the blowing of the container.

DETAILED DESCRIPTION OF DRAWINGS

Figure 1:
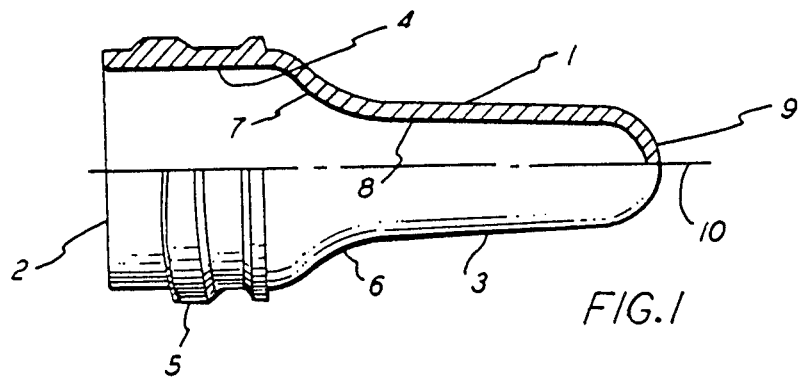
FIGS. 1 to 3
Figure 2:
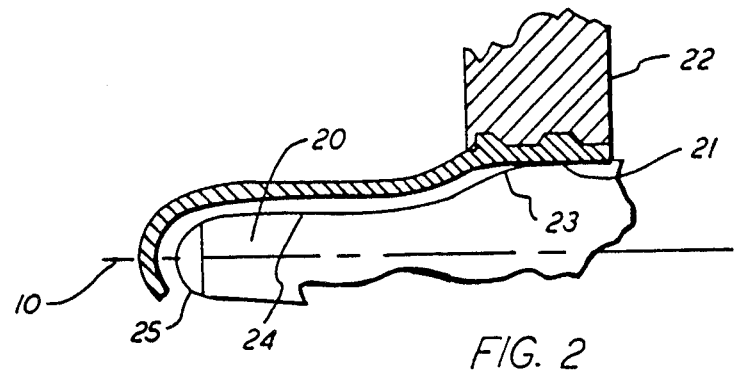
Figure 3:
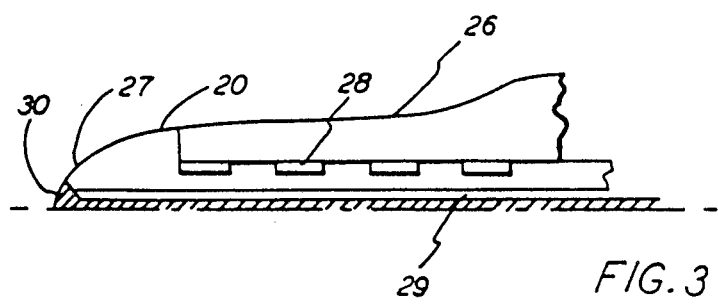

FIGS. 1, 2 and 3

With reference to FIG. 1, a one-piece preform 1 injection molded from a thermoplastic material, for example, polyester, consists of a neck or open end portion 2 and a body portion 3. The neck portion has a cylindrical interior surface 4 and an exterior surface upon which is formed a thread 5 and a junction part 6 connected with the hollow body portion 3. The body portion 3 is provided with a smooth interior transition 7 from the neck portion 2 to a frusto-conical interior section 8 closed at its narrow end, remote from neck portion 2, by a hemispherical end portion 9.

The interior of the preform 1 conforms with a core about which the preform was injection molded in a mold cavity with the cylindrical interior surface 4 rendering it possible to move the preform longitudinally, along the axis 10 relative to the core, once the core and preform have been removed from the injection mold cavity, thereby to space the body portion of the preform from the corresponding portion of the core to permit the temperature of the body portion of the preform to be regulated as desired throughout the wall thickness of the preform while, at the same time, maintaining a seal between the cylindrical interior surface 4 of the preform with the corresponding cylindrical surface of the core to facilitate subsequent blow molding of the preform to form a bioriented thermoplastic container.

The core upon which the preform 1 is molded is indicated at 20 in FIGS. 2 and 3. Core 20 has a cylindrical exterior sealing surface 21 which seals the neck portion of a preform injection molded thereon by virtue of the cooperation of the core 20 with a split neck ring or thread former 22 (shown in FIG. 2). The exterior surface of the remainder of the core, which is in communication with the preform, conforms to the interior surface shape of the body portion of the preform and includes a smooth transition portion 23 for shaping the junction part 6 of the preform, a frusto-conical section 24 and an end portion 25.

The taper of the frusto-conical section is such that when the preform and core are moved relative to one another longitudinally of the axis 10, the preform becomes thermally isolated from the core to a desired extent for timely temperature regulation of the preform in preparation for blow molding while, at the same time, the cylindrical interior surface of the neck portion of the preform maintains a sealing engagement with the cylindrical sealing surface 21 of the core.

With reference to FIG. 3, the core 20 is a bimetallic structure designed so that heat transfer is greater where required thereby to obtain the desired stretching effect for orienting the container material during the blow molding operation while the cooler portions of the preform, which receive the least amount of stretch, act as a piston to stretch the areas that are at the orienting temperature. For this purpose, different parts of the preform core are formed of materials, preferably metals, having different coefficients of thermal conductivity.

In a preferred embodiment, the core consists of an outer body 26 of one metal, for instance, steel, and a nose or tip 27 of another metal, for instance, a beryllium copper alloy, in order to provide differential cooling effect, with greater cooling on the tip. The nose 27 and the central cylindrical portion are integrally formed of the copper alloy and have a spiral cooling channel 28 formed therein. The beryllium copper nose and central portion define an axial high pressure air supply tube 29 controlled by a steel or beryllium copper pressure valve 30 which is opened, when desired, to permit high pressure blowing air to enter the preform and effect blowing of a container within a blow mold. When the tip of the preform is cooled to a temperature below that of the preform body in the manner above described, the tip serves, in effect, as a plunger during the blowing and thereby aids orienting the resin during blowing.

The opening of the valve 30 to blow the container may be effected in a known manner by application of the blowing air pressure against the action of a spring tending to close the valve.

FIGS. 4–9

Figure 4:
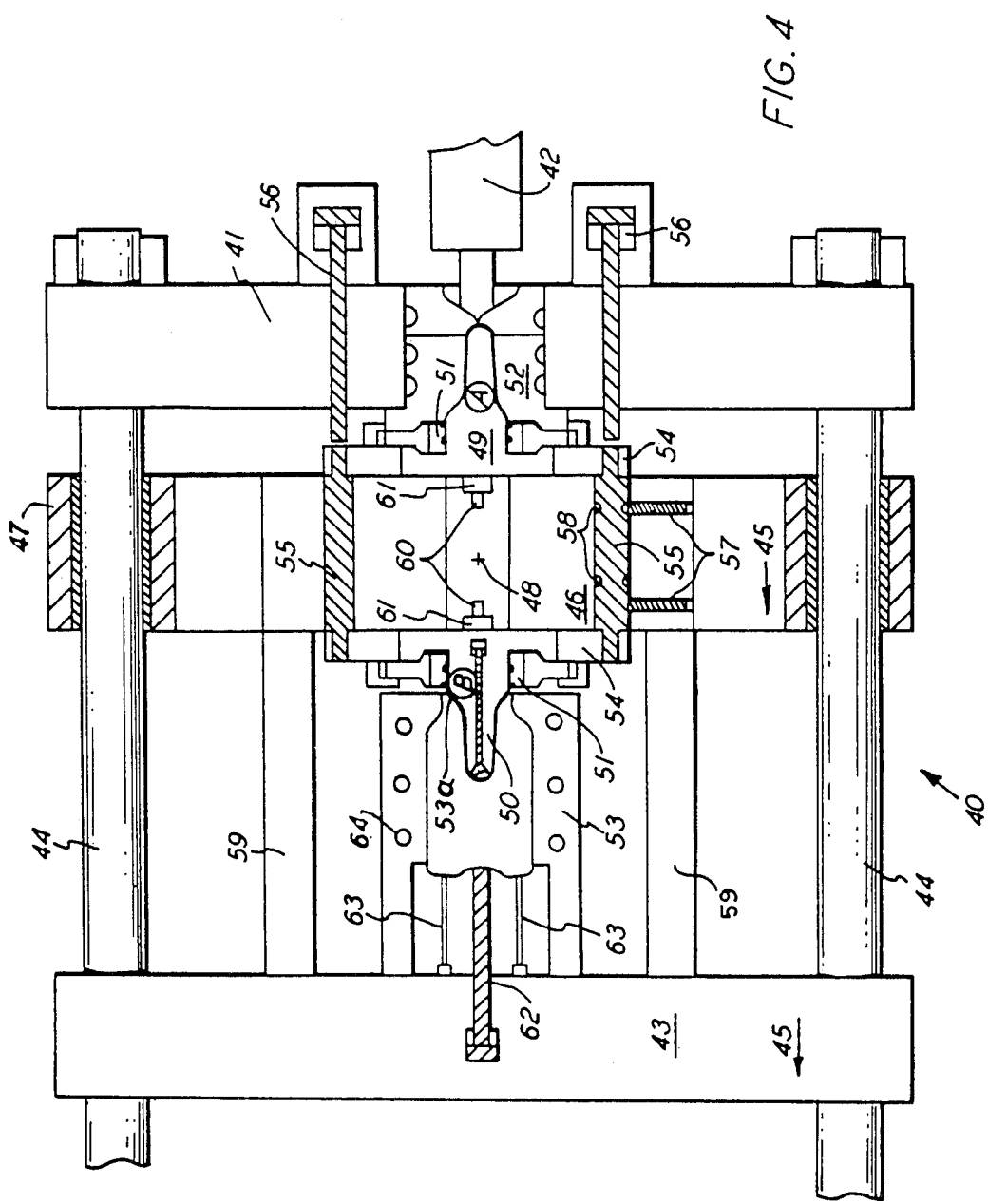
FIGS. 4 to 9

With reference to FIGS. 4 through 9, an injection blow molding apparatus 40 includes a preform injection molding station A supported by a fixed platen 41 for cooperation with an injection molding material extruder 42, a blow molding station B supported by a movable platen 43 which is movable along supports 44 in the direction of the arrow 45 (FIG. 4) to the position shown in FIG. 9 and back again, and a core-supporting turret 46 mounted on intermediate platen 47, disposed between the platens 41 and 43 and movable in the direction of the arrow 45 from the position shown in FIG. 4 to the position in FIG. 9, in which latter position, the turret 46 is rotatable about the axis 48 to reverse the positions of the cores 49 and 50, and back again.

The cores 49 and 50 are as described with reference to FIGS. 2 and 3, with the cylindrical portion of each core being circumscribed by a neck split, in this embodiment, a split thread forming member 51. The neck split or thread forming member 51 of the core 49, together with injection mold 52, defines a cavity into which thermoplastic material is injected by the extruder 42 to form a preform, such as that described with reference to FIG. 1. The split thread forming member 51 of the core 50 which carries a preform, following transfer thereof from station A to station B, serves to maintain a sealing contact between the preform and the core 50 while the preform is blow molded in blow mold 53.

Each split thread forming member 51 is supported by a thread-split holder 54. The thread-split holder 54 and its associated split thread forming member is mounted for movement by actuating pins 55 from the position shown in FIG. 4 to the position shown in FIGS. 5, 6, 7, 8 and 9, thereby to slide the preform at station B along the core to provide the above-mentioned thermally isolating space between the preform and the core while retaining a sealing engagement between the cylindrical sealing portion of the core and the neck portion of the preform.

The actuating pins 55 are moved by means of hydraulic actuators 56 mounted on the fixed platen 41 when the turret-supporting intermediate platen 47 is in the position shown in FIG. 4. Spring biased detents 57 mounted in the intermediate platen are arranged to resiliently engage grooves 58 in at least one of the actuating pins 55 thereby to resiliently locate the actuating pins in one or other of the positions shown in FIG. 4 and FIGS. 5, 6, 7, 8 and 9 respectively.

It will be appreciated that in alternative arrangements falling within the scope of the present invention:

The split thread forming member and its holder 54 at station A may be arranged to remain at station A while the core 49, with the preform formed on it, is moved with the intermediate platen 47 to a position in which it is rotated to station B with the split thread forming member shown at station B being replaced by a more economical clamping member able to engage the preform at station B to clamp that preform into sealing engagement with the core which carries the preform at station B. This alternative is illustrated in FIGS. 19 to 22, described hereinafter.

Closure struts 59 mounted on the movable platen 43 transmit closure forces from the movable platen 43 by way of the turret 46 to close the injection mold arrangement 49, 51, 52 against the injection pressures encountered while injection molding a preform at station A.

The turret 46 is provided with air inlet passages 60 for transmitting high pressure air for the blow molding operation through the center of the core positioned at station B and with coolant passages 61 for supply of coolant to the spiral cooling tubes 28 of the cores at stations A and B. A pneumatically operated ejector pin 62 is mounted on the movable platen 43 for ejecting a container following the blow molding operation from the blow mold 53.

The blow mold 53 is provided with air passages 63 for supplying air at a desired temperature into the cavity of the blow mold to achieve a desired temperature conditioning of a preform at station B, when it is spaced from its core as described above, to place the preform in appropriate temperature condition for blow molding to produce the desired bioriented thermoplastic container. When air is introduced through the passages 63, that air may be discharged through the annular space 53a between the mold and the preform on the preform core.

The injection mold 52 and the blow mold 53 are provided with passages 64 for coolant in a manner known in the prior art.

The present invention is being described with reference to an injection blow molding apparatus utilizing a rotating turret (a Piotrowski turret), in which the turret is rotated 180° from an injection molding station at which a preform is injection molded to a blow molding station, with the blow molding and the injection molding being independently carried out possibly simultaneously.

The sequence of operation of the injection blow molding apparatus described with reference to FIGS. 5 through 9 will now be described with reference to these figures which, in numerical sequence, show the apparatus at various sequential stages of its cyclic operation.

FIG. 4 shows the apparatus immediately following completion of the injection molding of a preform on the core 49 at station A. In this operational condition, the injection molding assembly 49, 51 and 52 is held closed by the closure force supplied by the movable platen 43 by way of struts 59 and turret 55. A previously molded preform is shown in blow mold 53 on the core 50 at station B. The split thread forming members are in their closed positions in which they clamp the neck of the preforms against their respective cylindrical sealing surfaces of the cores 49 and 50. In this condition, the preform on core 50 is being cooled by the cooling action of the coolant passing through the passage 28 in the core 50 and by air being blown into the blow mold 53 by way of the air passages 63.

Figure 5:
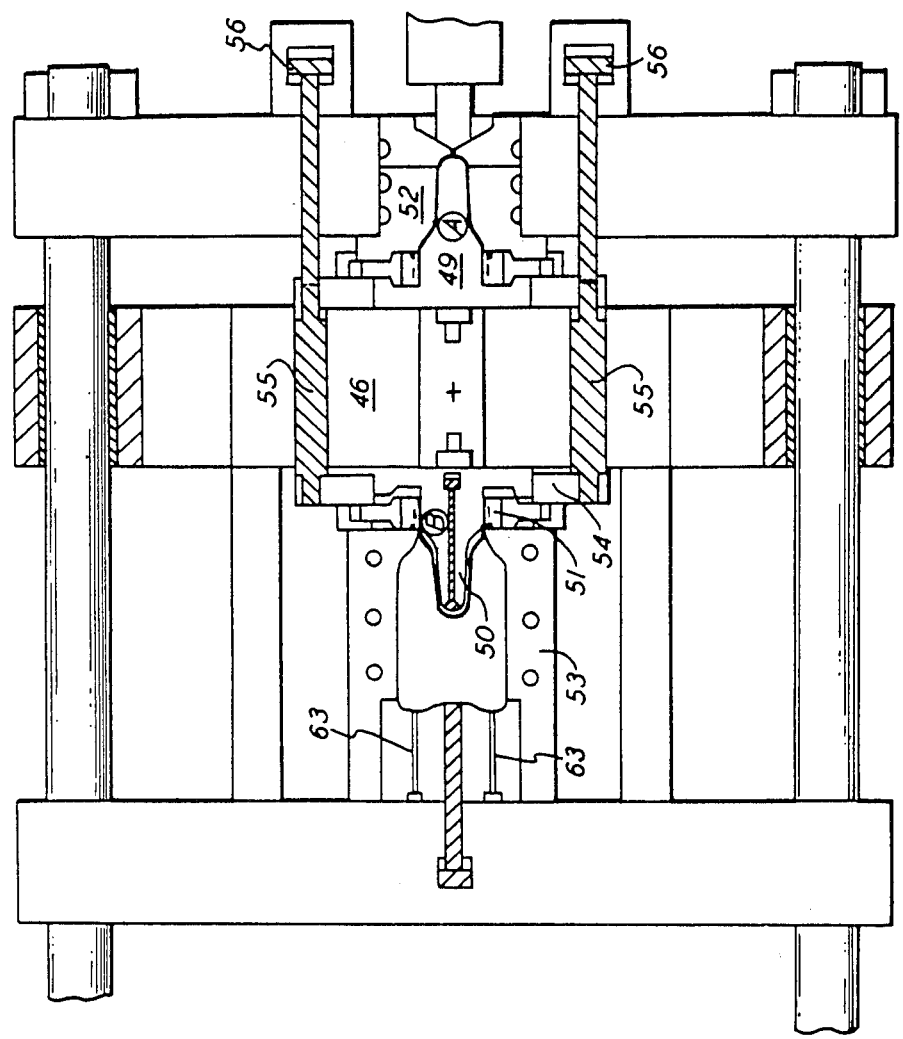

FIG. 5 shows the apparatus in the next stage of operation in which the preform on the core 49 is cooling and the hydraulic actuators 56 have been operated to move actuating pins 55 to move the thread-split holder 54 and split thread forming member 51 at station B laterally of the turret 46 to shift the body portion of the preform at station B away from the core 50, while maintaining the neck of the preform at station B in sealing contact with the cylindrical sealing surface 21 of the core 50, thereby providing for the desired temperature conditioning of that preform.

At station A, the cooling of the preform by the mold 52 occurs for only a matter of seconds, as the outside surface of the preform shrinks away from the internal surface of the mold shortly after injection mold pressure is released. At station B, the space between the core and the body portion of the preform is typically at least 0.05 mm. The spacing of the preform from the core conditions the temperature of the preform which, during cooling on the core 50, has become too cool on its internal surface while being insufficiently cooled on its exterior surface, whereby the interior surface of the preform is too cold for optimum orientation conditioning for blow molding, while the exterior surface is too hot. By virtue of the movement of the preform to provide a gap between the preform and the core, depending upon the material used and the operating conditions, the temperature gradient through the material of the preform diminishes sufficiently to provide the desired blowing condition for orientation. However, if needed, air may be blown into the blow mold 53 through the passages 63 to provide additional cooling in order to reach a desired temperature condition in the preform to provide the desired blowing condition. Achieving this temperature conditioning, the outer and inner surface temperatures of the preform are preferably allowed or caused to come close to equilibrium and thus to the orienting temperature desired. The ability to release the preform from the core at any time within the processing cycle, after indexing, provides considerable freedom of control in varying the conditioning temperatures and temperature gradients.

During this sequence of operations, it will be noted that the preform is never removed from the core upon which it was injection molded until after the blow molding operation to produce a bioriented container has taken place.

Figure 6:
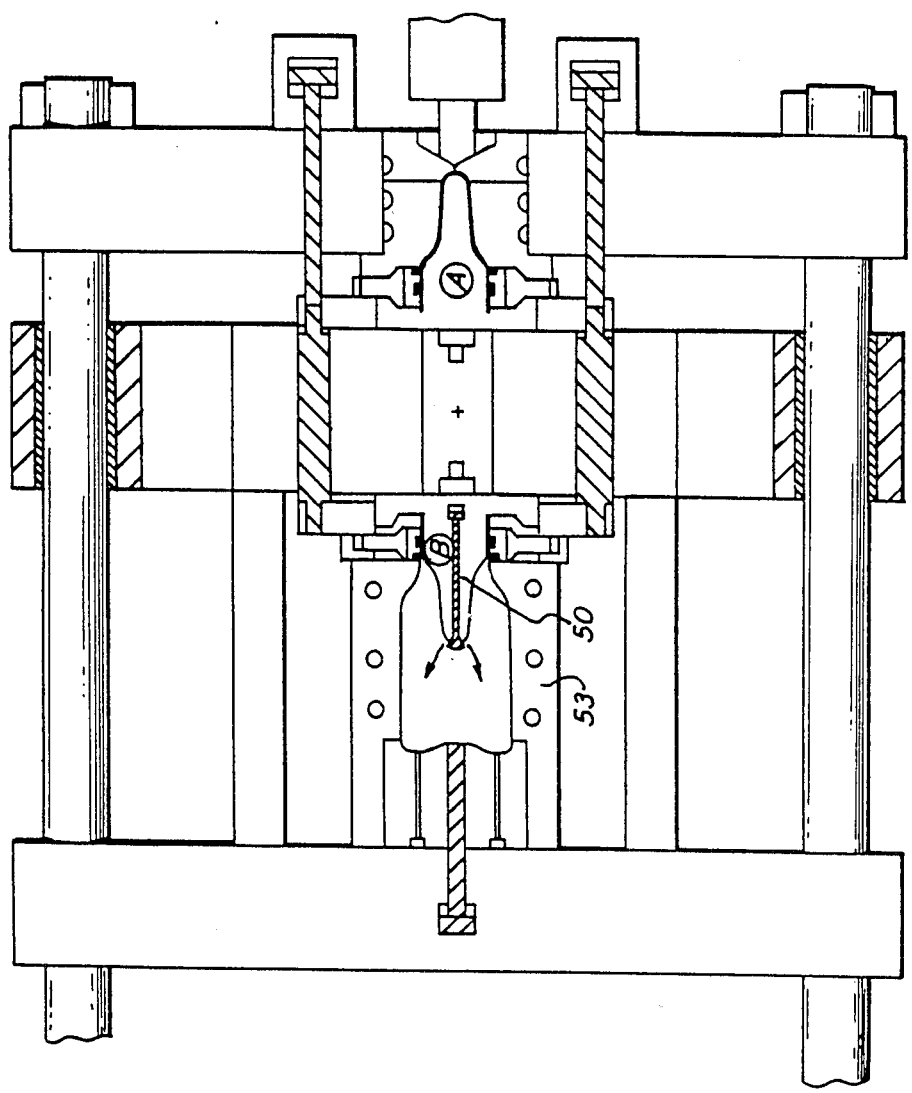

FIG. 6 illustrates the stage in the sequence of operations of the injection blow molding apparatus in which air at a pressure of 50 to 650 lbs./square inch is supplied along the central tube past the valve of the core 50 to inflate the now temperature conditioned preform until it engages the walls of the blow mold cavity of blow mold 53. The proper temperature conditioning of the preform together with the correct design of the core and cavity of the blow mold 53 ensures proper stretch and blow ratios. The core, as described with reference to FIG. 3, has a higher heat conductive metal forming the end portion than that of the side walls of the main body part of the core. The preform tip is also thinner than the wall sections and, because of its lower temperature resulting from the greater conductivity of the end portion of the core, is stiffer than the wall portions of the preform. This causes the end portion of the preform to act as a piston when air under pressure is supplied through the core which causes a relatively high stretch in the wall of the preform in both the axial and circumferential direction. This provides the desired biorientation of the material of the container.

In connection with the blowing operation, it is pointed out that the invention contemplates that, during the actual blowing, the pressure acting to hold the neck ring in closed position should be at least substantially as great as the blowing pressure used, thereby minimizing pressure leakage and counteracting any tendency for the blowing pressure to open the neck ring.

Figure 7:
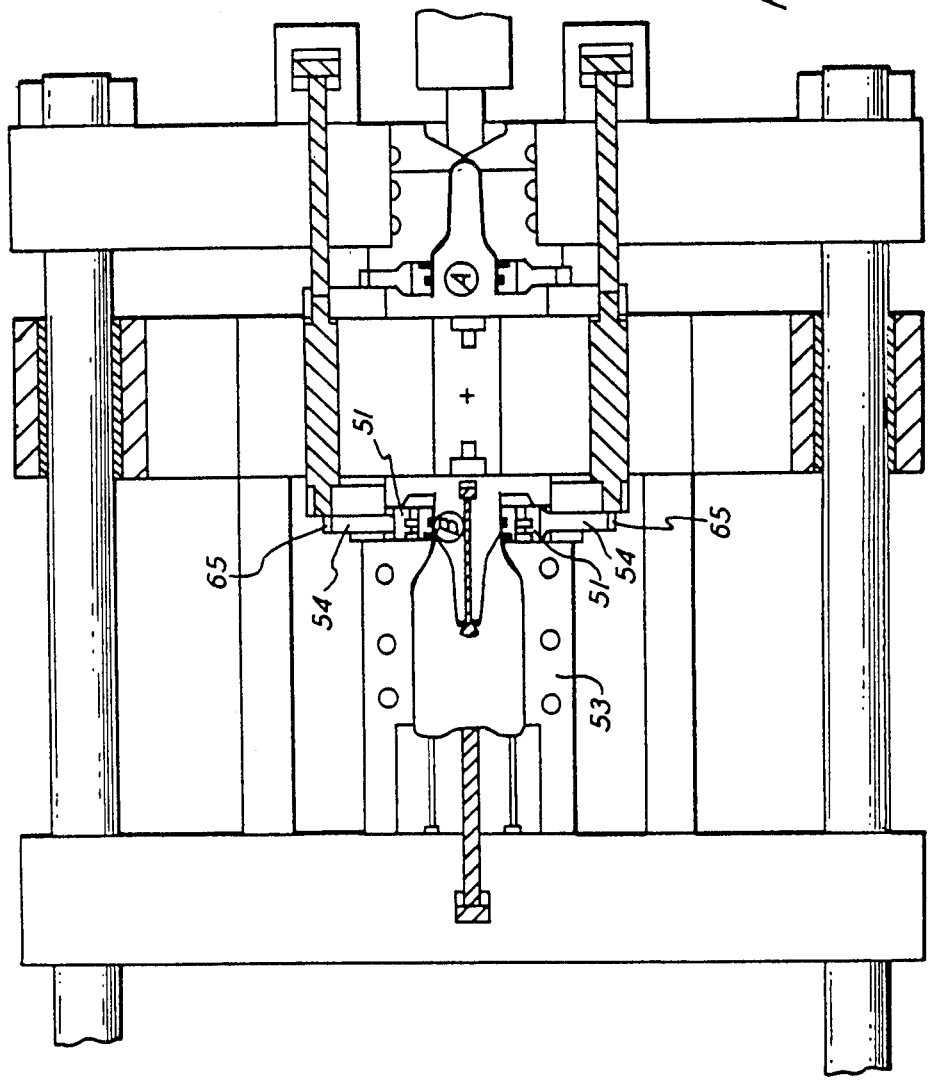

Following the blow molding operation in the blow mold 53, the split thread forming member 51 and its thread-split holder 54, which are in two halves split diametrically across the centerline of the threads of the container to be produced, are moved apart by a thread-split actuating mechanism 65 to the position shown in FIG. 7, in which the neck of the container which has been blown in blow mold 53 is released.

Subsequently, the movable platen 43 is moved in the direction of the arrow 45 to the position shown in FIG. 8, and the ejector pin 62 is actuated to eject the container from the blow mold.

Figure 8:
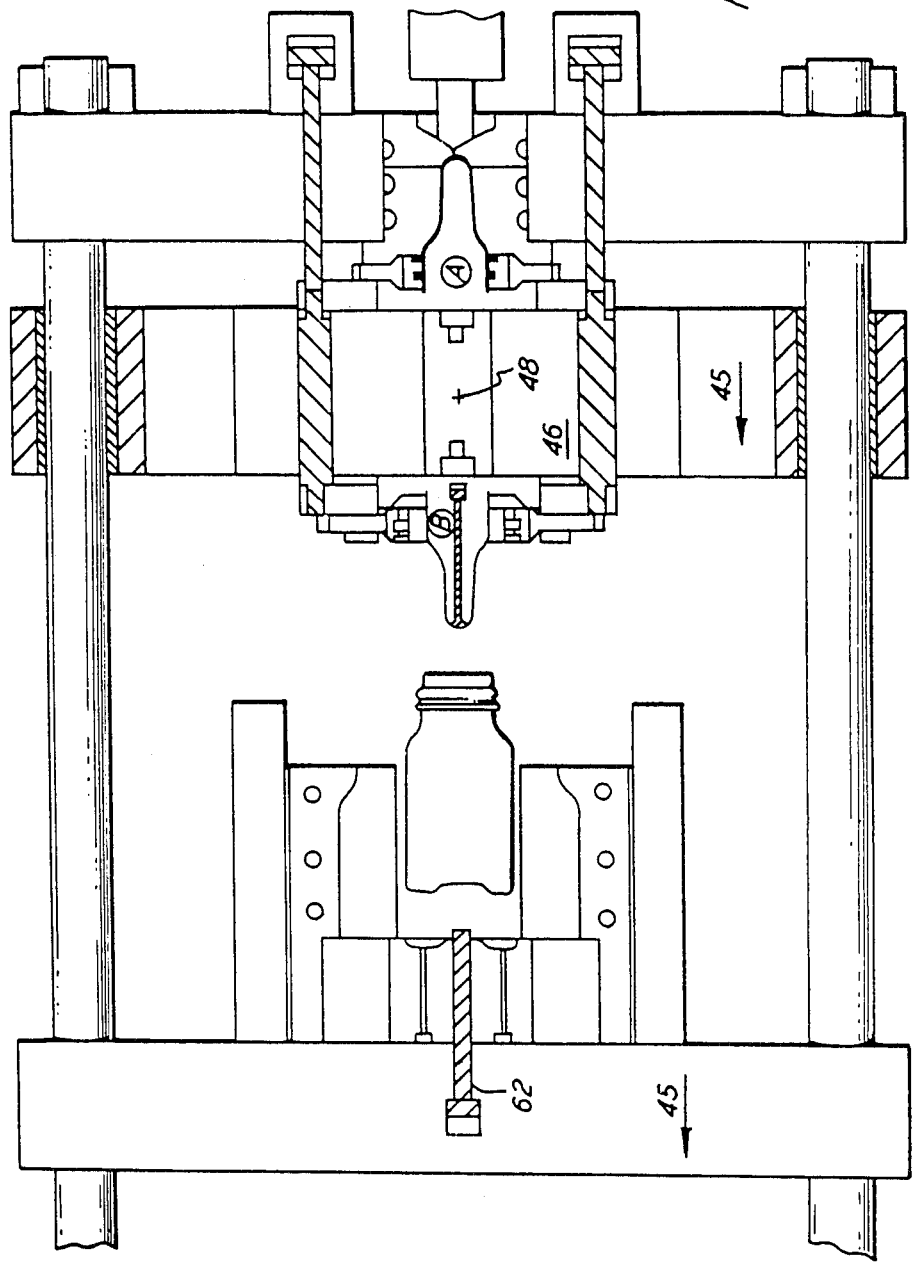
Figure 9:
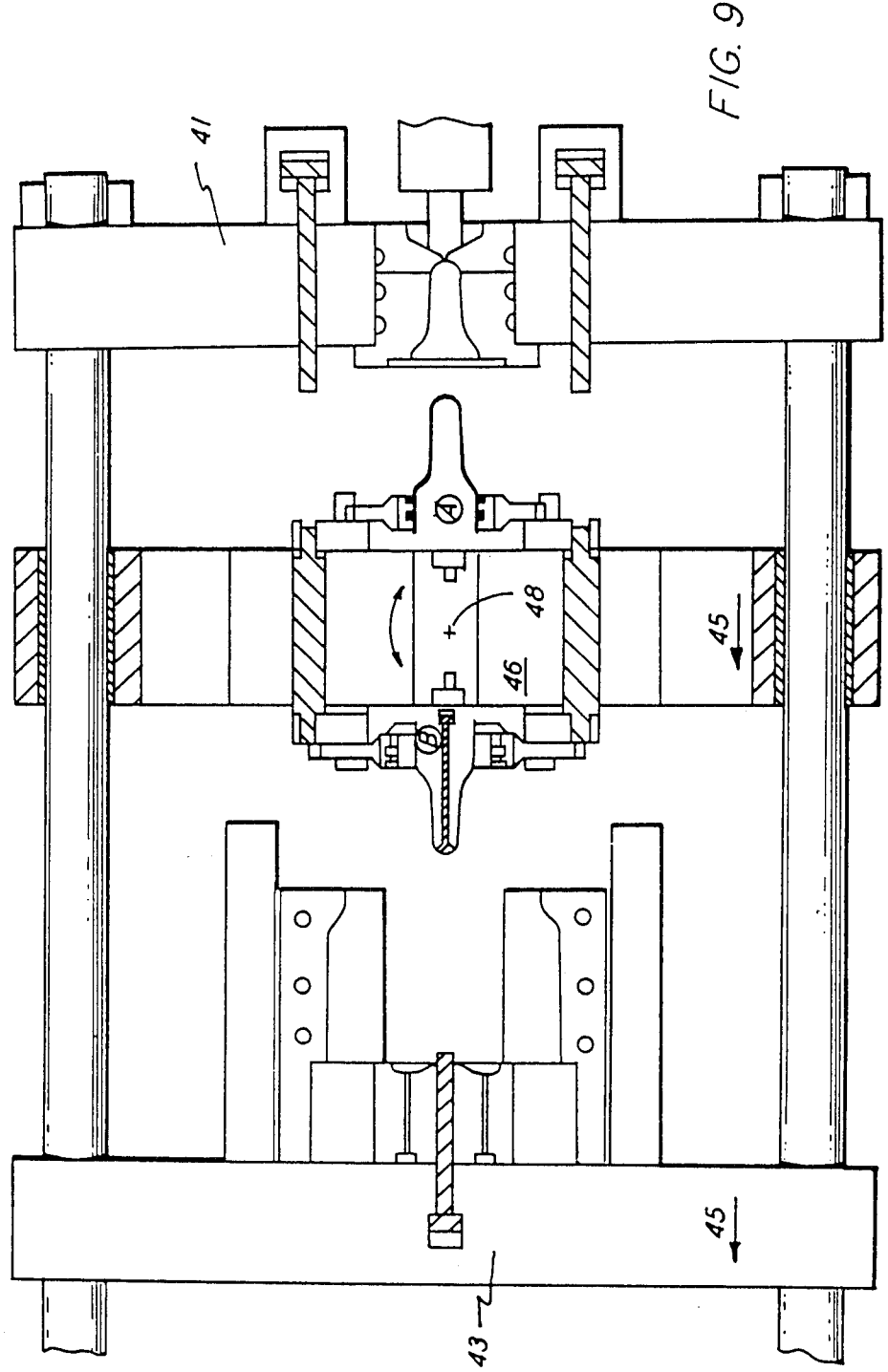

After ejection of the container, as illustrated in FIG. 8, the intermediate platen is moved in the direction of the arrow 45 to the position shown in FIG. 9, in which the turret 46 can rotate about the axis 48 to move the preform, which has been injection molded at station A, to station B in preparation for closing of the injection and blow molding apparatus in order that it adopt the position shown in FIG. 4 in preparation for injection molding a further preform at station A and temperature conditioning the preform, which is being moved to station B, and subsequently blow molding that preform. During this mold closing, the closing pressure moves the split thread forming member 51 and its holder 54 back into the position in which they abut the turret 46, and the thread-split actuating mechanism 65 is operated to close the split members together about the cylindrical sealing surface of the core at station A, thereby to define the neck portion of the preform to be molded.

Figure 10:
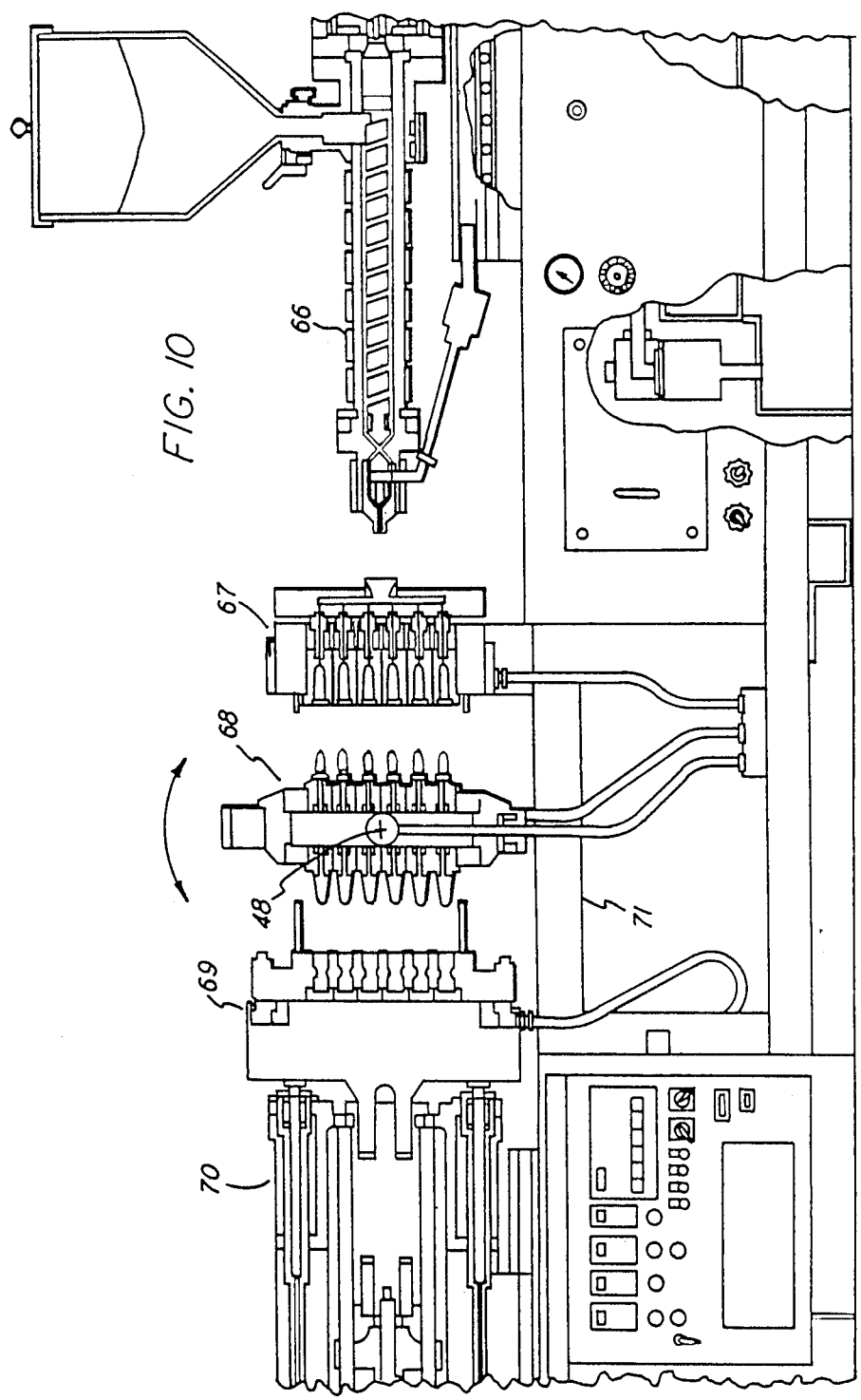
FIGS. 10 to 14
Figure 11:
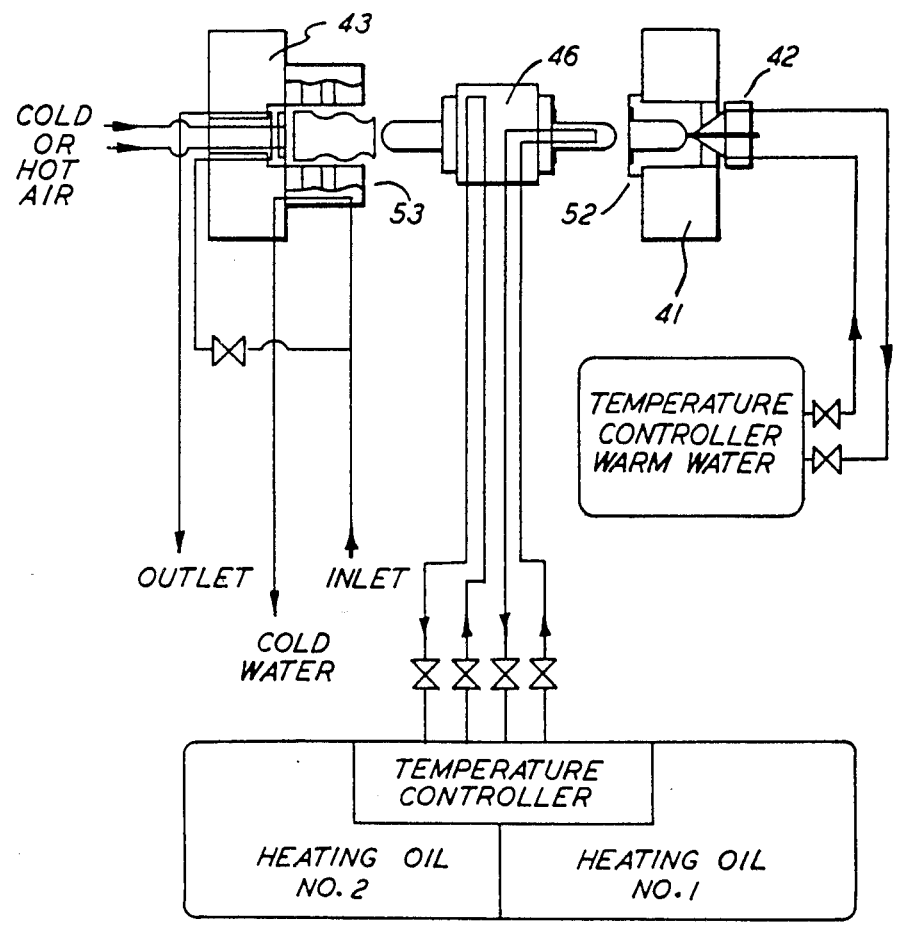

FIGS. 10 and 11

FIG. 10 illustrates a production injection blow molding apparatus utilizing the present invention in an arrangement in which there are six identical injection molds and twelve associated cores disposed in two vertical parallel rows of six, with a similar arrangement of blow molds and associated cores. The apparatus of FIG. 10 includes an extruder assembly 66, a twelve cavity injection mold unit 67, a rotatable core mounting turret 68 adapted to rotate through 180°, and back, about the axis 48 and a twelve cavity blow mold 69. The opening and closing of the mold units of the apparatus is carried out by a mold clamping unit 70. The apparatus is supported on a bed 71 which carries the controls utilized for operating the apparatus.

FIG. 11 illustrates the temperature control arrangements utilized in the injection molds, the cores, and the blow molds. Again, parts corresponding to those discussed with respect to FIGS. 4 through 9 are given similar reference numerals.

FIG. 12

Figure 12:
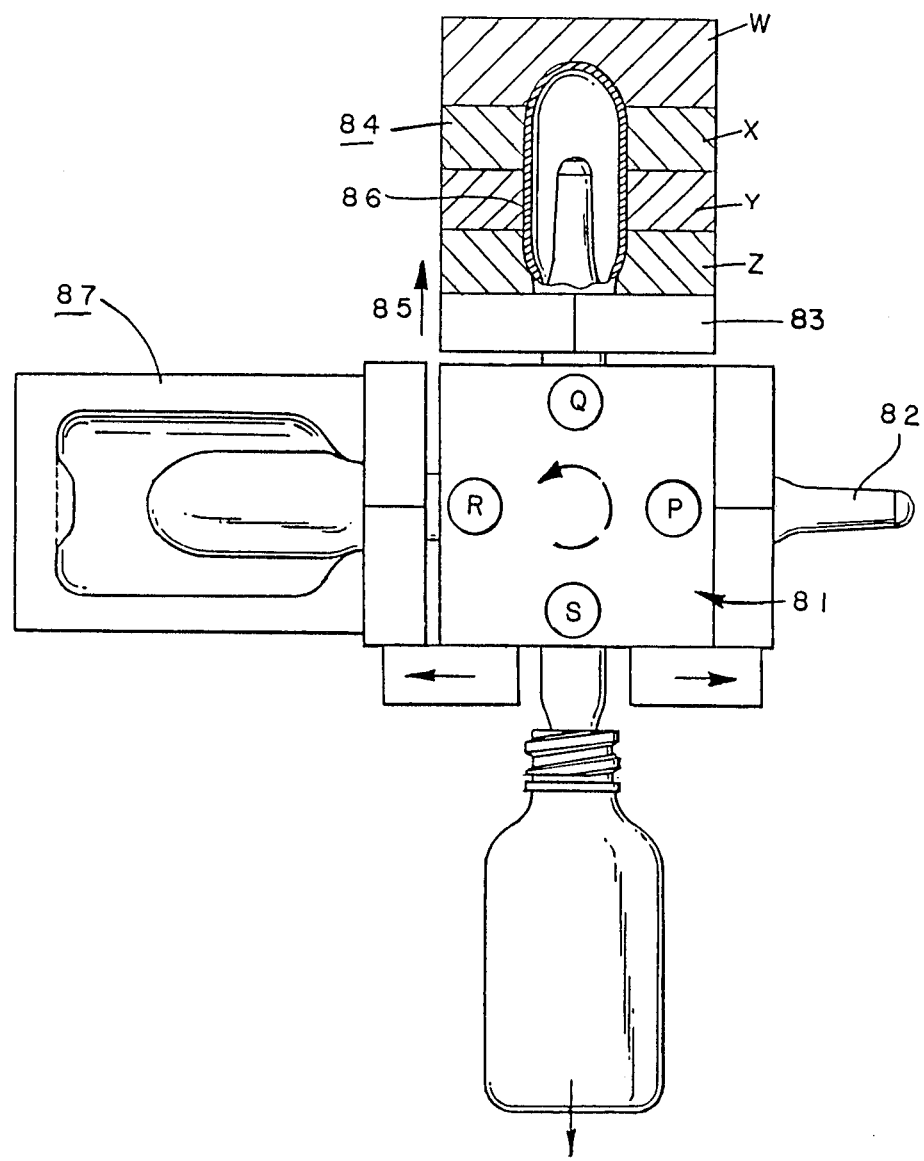

FIG. 12 illustrates an alternative construction of injection blow molding apparatus utilizing the present invention in a four-stage rotary motion of a turret 81, in which a core 82 is sequentially rotated from station P to stations Q, R and S prior to return to station P. At station P, a preform is injection molded on a core in a manner similar to that discussed with reference to FIGS. 4 through 9. The core and preform shape are the same as described with reference to FIGS. 1, 2 and 3, and the neck of the preform is held in sealing engagement with the core by a split thread forming member 83, again in similar manner to that described in reference to FIGS. 4 through 9. Following formation of the preform at station P, the turret is rotated through 90°, and the core and preform are placed in a preblow heating chamber 84 which has a plurality of heating zones W, X, Y and Z, by virtue of which the temperature of various portions of the preform can be very accurately controlled prior to movement of the preform to the blow molding station R. At station Q, the split thread forming member 83 is moved away from the turret in the direction of the arrow 85 to move the preform along the core to provide a desired spacing of the preform body portion from the core, as discussed above with reference to FIGS. 1 through 9 to provide desired temperature conditioning of the preform prior to preblowing. At station Q, the preform, once this temperature conditioning is achieved, is blown to form an intermediate size preform contacting the walls of the cavity 86 of the preblow heating chamber, with the partially blown preform then being temperature controlled, as desired preparatory to moving to the blow station R, by programmed control of the temperatures of zones W, X, Y and Z. When the desired temperature of the partially blown preform is achieved, the preblow heating chamber 84 is withdrawn and the turret rotated a further 90° to bring the core and partially blown preform to the blow molding station R. The split thread forming member 83 maintains the neck of the preform in sealing engagement with the cylindrical sealing surface of the core throughout the processing steps carried out at stations P, Q and R.

At the blow molding station R, a blow mold 87 is moved into place over the preblown and temperature conditioned preform, and the blow molding is completed as previously described. Subsequently to this blow molding, the turret is rotated a further 90° to bring the new blown bi-oriented container to station S where the split thread forming member is open and the container ejected.

It will be appreciated that the four stages of this arrangement can be operated together whereby four containers in various stages of manufacture are made together By use of the four-stage process described with reference to FIG. 12, containers of more complex structure and variable wall thickness can be produced, and no temperature control is required in the blow mold at station R, with a high production rate consequently being possible.

Operating Features of FIGS. 1 to 12

Although the invention has so far been described with reference to containers having a thread formed on the neck of the preform, it will be appreciated that the invention is not restricted to the production of such containers and that necks with flange or other configurations can readily be produced by the invention of the present application. The present invention is, further, able effectively to produce wide mouth containers which presently cannot be made as efficiently by present injection blow molding systems.

Apart from the design of preform, core and injection blow molding apparatus, the present invention also provides an innovative process for blow molding as follows.

A preform is injection molded in an injection mold cavity on a core to which a neck portion of the preform is sealed and by virtue of the shape of which the preform can be moved longitudinally of the core to space the main body of the preform from the core a sufficient distance to provide desired thermal isolation of the preform from the core while, at the same time, the seal of the neck of the preform against the core is maintained. The preform spaced from the core is then conditioned as to temperature to produce a desired temperature distribution throughout the material of the preform for a desired blow molding performance. This temperature conditioning may include the blowing of air at a controlled temperature over the exterior surface of the preform. Following the temperature conditioning, the preform is blown in a blow mold to produce a bioriented thermoplastic material container. Between the temperature conditioning of the preform and the blow molding step, the preform may be part blown to a preblow shape which is subsequently temperature controlled to a desired temperature condition prior to a final blow molding step. The fully blown container is then released and ejected. In a preferred form of the process, a preform and core upon which it is mounted, are indexed from the injection station to the blow molding station with injection and blow molding thereby being possible at the same time.

The present invention has been described with reference to a symmetrical circular cross section preform. However, it will be appreciated that other cross-sectional shapes fall within the scope of the present invention. In addition, it is the interior surface(s) of the preform which are designed to achieve a seal with the core while permitting relative movement to introduce a thermally isolating gap. Of course, the exterior surface(s) of the preform may be whatever is desired to produce the material distribution for the container to be blown from the preform.

Figure 13:
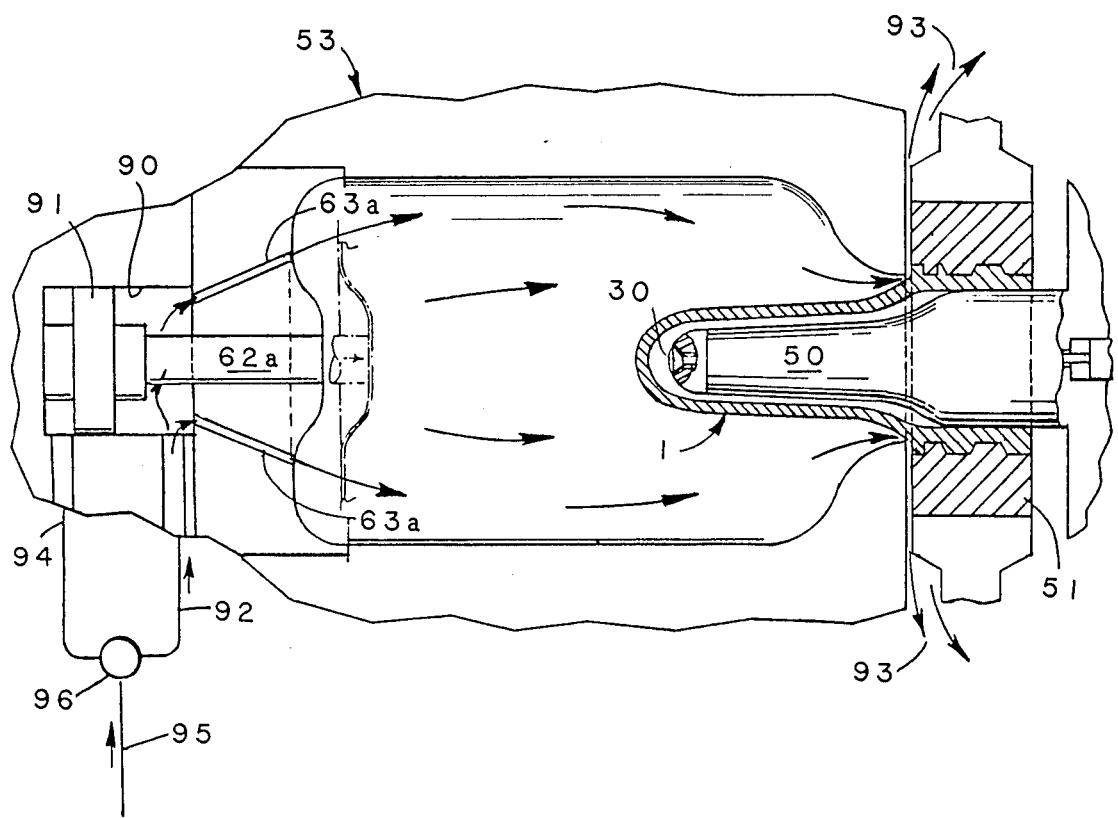

FIG. 13 and Operating Features

Turning now to the embodiment illustrated in FIG. 13, it is first pointed out that this figure somewhat diagrammatically illustrates a blow mold of the kind shown in FIG. 4, but with certain modifications. The mold itself is identified by the numeral 53 as in FIG. 4, and in addition, the preform core is indicated again by the numeral 50. The neck split is shown at 51, and in the position illustrated, the split has been shifted in a direction toward the tip of the core in order to provide for spacing of the principal portion of the preform 1 with respect to the preform core.

As in FIGS. 4 and 5, passages are shown as provided in the bottom wall of the blow mold, these passages being indicated in FIG. 13 by the reference numeral 63a, and it is to be understood that a sequence of those passages is preferably provided, being distributed in the form of an annular ring extending through the bottom wall of the mold. The outer ends of the passages 63 communicate with the cylinder 90 provided outside of the bottom wall of the mold, and in this cylinder, there is provided a piston 91 to which the ejector rod 62a is connected. Passages for inletting air under pressure are provided in the cylinder 90 at both sides of the piston. Thus, a passage 92 is connected with the cylinder at the side of the piston adjoining the bottom wall of the blow mold, and when air under pressure is introduced through the connection 92, it is distributed through the cylinder and introduced into the inlet ends of the annular ring of passages 63a, from which the air is introduced into the bottom of the blow mold cavity provided in the blow mold 53.

In accordance with the arrangements previously described, this air may be employed for the purpose of regulating the temperature of the preform just prior to the actual blowing of the article. In most installations, this air would be at a temperature providing for cooling of the outer surface layer of the preform. The air may be discharged from the blow mold cavity through the annular space provided between the mold wall and the neck ring split, as indicated by the arrows 93.

When the blowing air is introduced through the preform core, by the opening of the valve 30 in the tip of the preform core 50, the blowing air enters the interior of the preform and effects the blowing operation in the manner above described, providing for the biorientation of the resin material with consequent production of an article of high strength and stress resistance.

After the article has been cooled, it is desired that it be ejected from the blow mold in the manner described above by means of an injector pin 62a which, in this case, comprises a rod extended from the piston 91. This ejection is effected by introducing air into the cylinder 90 through the connection 94. It is further noted that, as shown in FIG. 13, it is contemplated that a common pressurized air supply indicated at 95 be delivered through a valve 96 providing (preferably automatically) for alternative delivery of air either through the connection 92 to the side of the piston adjoining the bottom of the blow mold, or through the connection 94 to the opposite side of the piston. Thus, a common air supply may be used for both of these purposes, i.e., the purpose of cooling the outer layer of the preform, and the purpose of ejecting the blown article. This valve also desirably has an off position.

Figure 14:
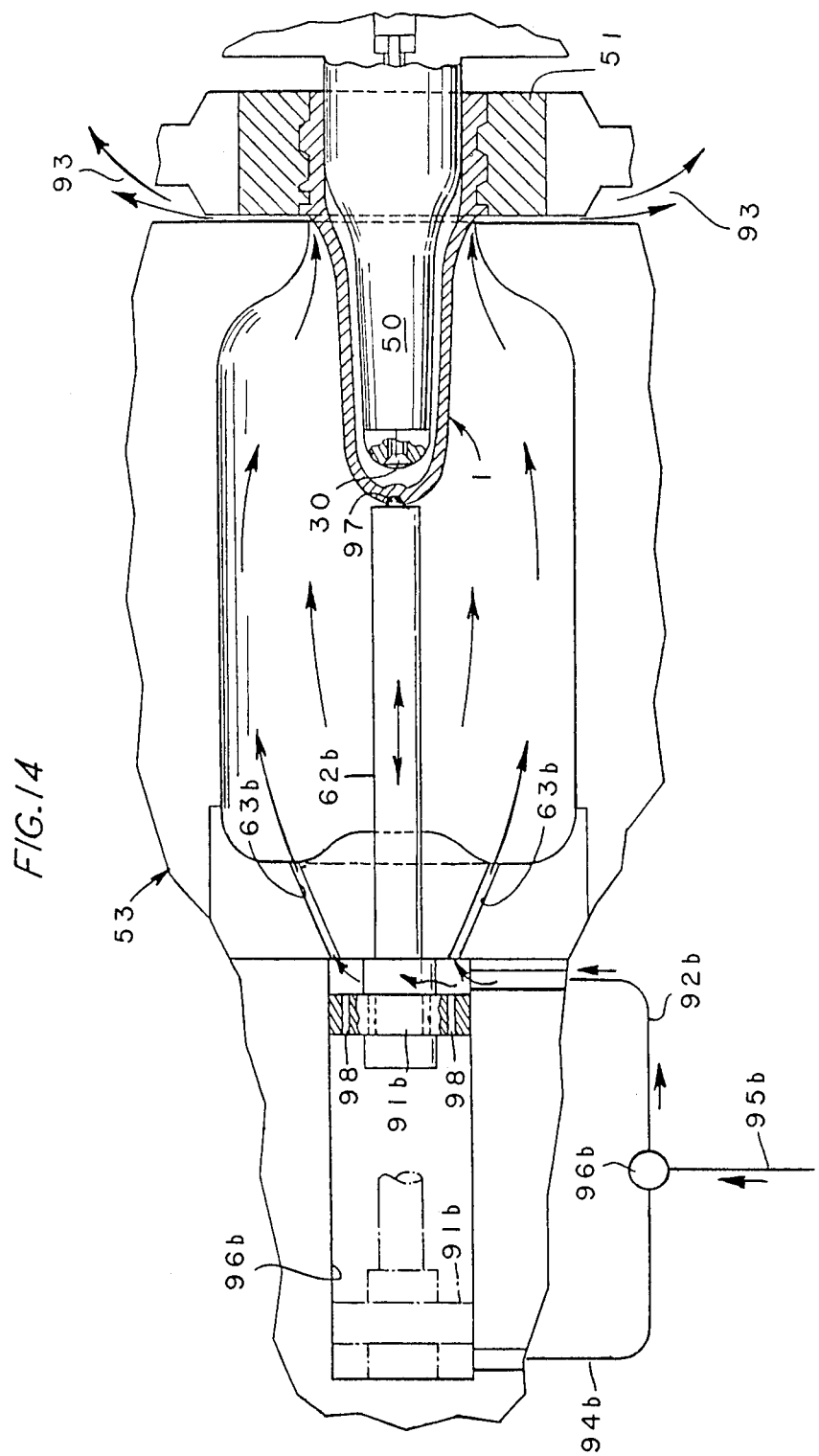

FIG. 14 and Operating Features

Turning now to the embodiment shown in FIG. 14, it is first noted that in this embodiment, a number of features are present in the same manner as in FIG. 13. Thus, it will be noted that the preform core is again indicated at 50, the preform itself being generally identified by the reference numeral 1. The neck of the preform is surrounded by the split neck ring 51, and, as in FIG. 13, the core and preform are illustrated as initially received in the blow mold 53.

In contrast with FIG. 13, the embodiment of FIG. 14 is provided with a pin 62b of considerably greater length than the ejecting pin 62a of FIG. 13, and in the embodiment of FIG. 14, this elongated pin serves not only the ejector funtion but it also serves as a centering device connecting with the lowest end or tip of the preform and serving to guide the end portion of the preform as it moves toward the bottom wall of the mold when the preform is blown.

The pin 62b is connected with a piston 91b working in a cylinder 90b and, in this case, the cylinder is also of considerably greater length than the cylinder 90 of FIG. 13. The cylinder, piston, and pin are all proportioned so that the pin will have a stroke or range of travel sufficient to position the free end of the pin at the bottom of the blow mold, alternatively in a position advanced to the bottom wall of the preform when the preform is first introduced into the blow mold. As seen in FIG. 14, a projection or tip 97 is provided on the end of the pin, and this tip will project into the softened plastic material of the preform and, therefore, establish an interrelation between the preform and the pin, with consequent steering or centering action as the bottom of the preform advances toward the bottom of the blow mold during the blow molding operation. With appropriate venting of the ends of the cylinder 90b, it is contemplated that the mechanical action of the end wall of the preform will be adequate, at least in most cases, to move the pin 62b into the piston 91b from the position shown in FIG. 14 to a position in which the tip of the pin is advanced to the bottom wall of the mold. This is provided by venting the base end of the cylinder 90b to atmosphere.

As in the embodiment of FIG. 13, it is contemplated also to provide for the introduction of a heat-transfer gas through passages 63b in the bottom wall of the mold, which gas may aid in conditioning the temperature of the preform just prior to the blowing operation. When this feature is employed, as in FIG. 13, the heat-transfer gas will escape around the neck of the preform and beyond the neck ring as indicated by the arrows 93.

A pressure fluid supply line 95b is provided, being associated with an appropriate control valve for delivery of pressurized gas into either end of the cylinder 90b through the passages 94b or 92b. The valve arrangement also desirably provides for capability for venting of at least the end of the cylinder with which the passages 94b are connected, this feature being employed, for example, at a time when the blowing operation results in shifting of the pin 62b and the piston 61b toward the left as viewed in FIG. 14.

Transverse passages 98 extend through the piston 91b, and these may serve to deliver pressurized fluid from the left side of the piston 91b to the right side and thus serve as a source of fluid to be delivered through the passages 63b into the blow mold prior to the blowing.

The passages 98 may also be employed as a means for controlling the rate of piston movement when the pin is serving to center or guide the preform during the blowing operation.

The pin 62b may serve the ejector function after the article is blown and when the blow mold is open, by introducing pressurized fluid through the passages 94b.

From the above, it will be seen that common mechanism provides for several different functions in the arrangement of FIG. 14. The piston 91b, pin 62b and the passages 98 and 63b may be employed to serve in various ways as a means for controlling the temperature of the preform, as a means for centering the preform when it is blown, and as a means for ejecting a completed or blown article.

FIGS. 15 to 18A and Operating Features

FIGS. 15 to 18A illustrate certain alternative features which may be employed in equipment of the kind shown in FIGS. 1 to 14. In the arrangement of FIGS. 15 to 18A, as in the arrangement of FIGS. 1 to 9, a neck split is provided, the components of the neck split being arranged to remain with the core during movement of the core alternately between the injection molding and the blow molding stations.

In the production of a typical container having a threaded neck, the neck split components are utilized for the formation of the threads on the neck at the injection molding station. As in the arrangement of FIGS. 1 to 9, the neck split components are arranged for movement toward and away from each other, and in the inner position, the confronting surfaces of the neck split components abut each other in a position defining a cavity for the neck of the preform, usually having a threaded exterior surface.

Figure 15:
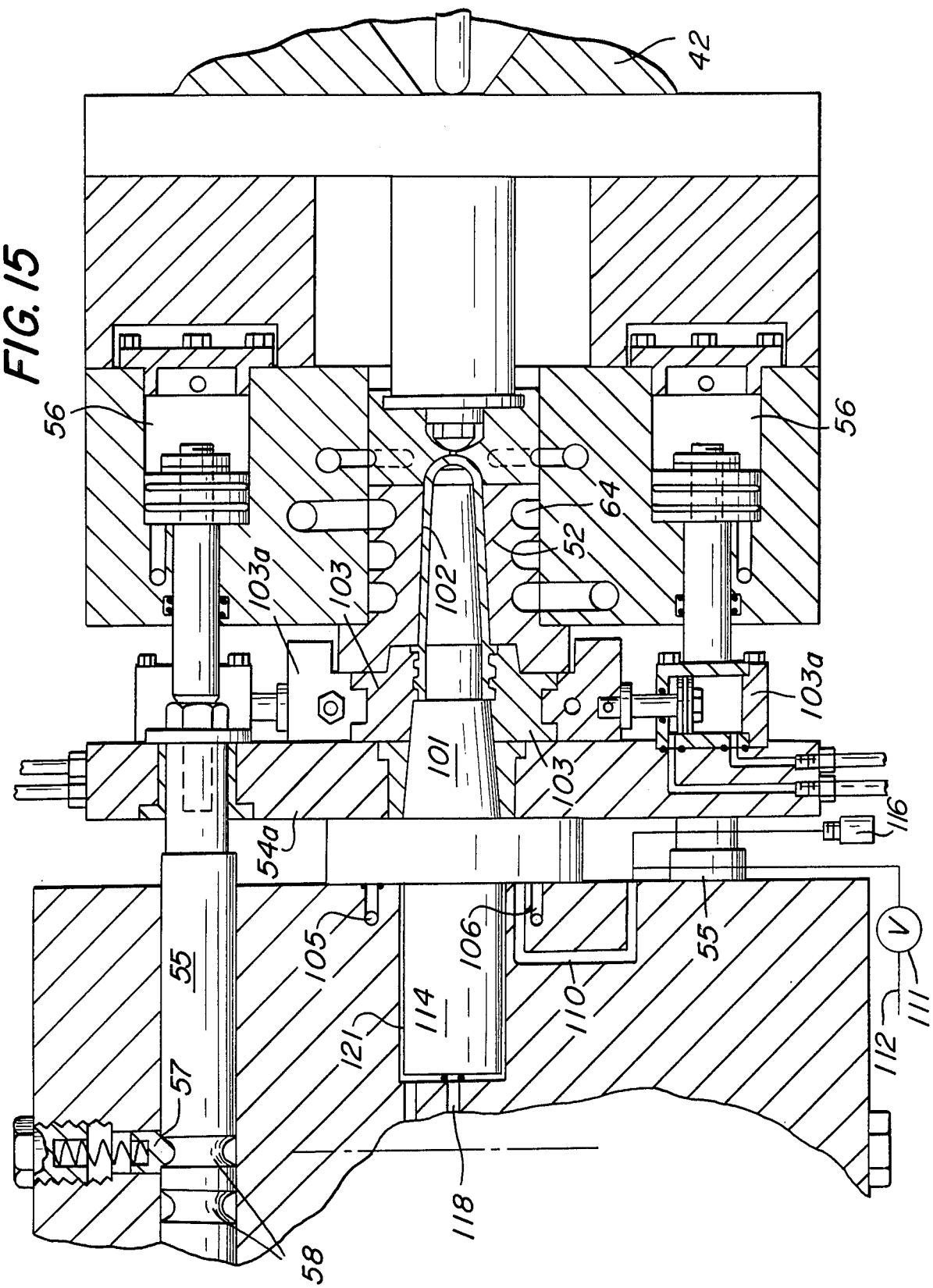
FIGS. 15 to 18A

In explanation of the structure and operation of the mechanism shown in FIGS. 15 to 18A, it is here pointed out that in FIGS. 15, 15A and 15B, the core is shown as positioned in the injection molding station, and in FIGS. 16, 16A, 17, 18 and 18A, the core is presented toward the blow molding station. FIG. 15A discloses not only the external contour of the core and associated parts, but also the internal passages and structural arrangements of the core and its associated parts, but it is to be kept in mind that in the injection molding station, which is represented by FIGS. 15, 15A and 15B, various of the internal parts and associated operating mechanisms are not in active use (for instance, the cylinder 103a), such parts being provided for special purposes described more fully hereinafter with reference to the core when it has been shifted from the injection molding station to the blow molding station, as in FIGS. 16, 16A, 17, 18 and 18A. In the embodiment of FIGS. 15 to 18A, the core is indicated at 101, and the preform is shown at 102. The neck split components are shown at 103.

In the injection molding station, see especially FIG. 15, the split neck ring components 103 are held in closed position by the interengagement of the neck splits 103 in the tapered cavity provided at the entrance of the injection mold 52.

FIG. 15 also shows the injection mold 52 and the extruder 42 for delivering the material into the injection mold cavity.

After injection of the preform in the injection molding cavity, the turret 46 is separated from the injection molding station and the turret is then turned 180° in order to bring the core and the injection molded preform into a position presented toward the blow molding station. The separation of the turret 46 from the injection molding station is indicated in FIG. 9.

Figure 16:
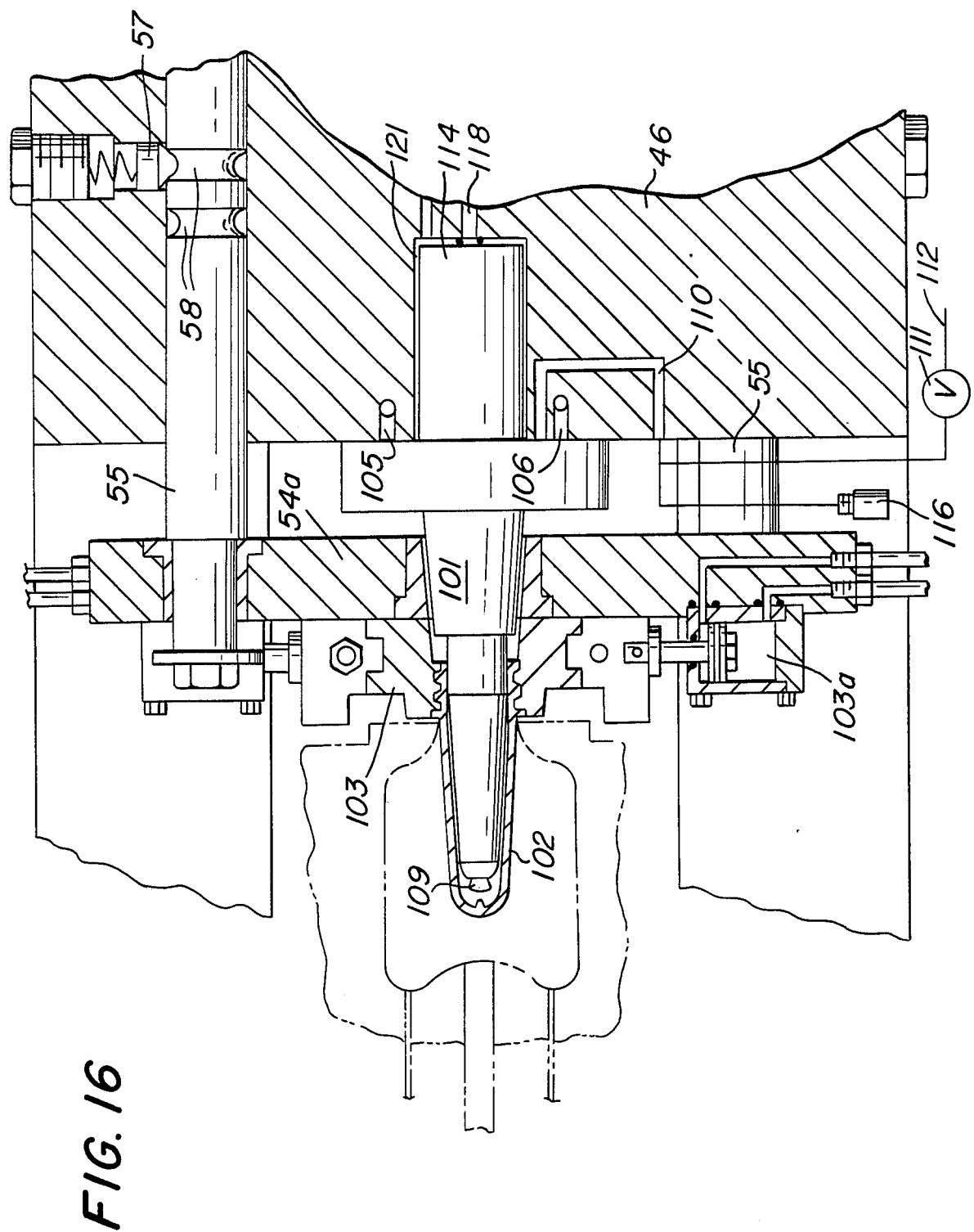
Figure 16A:
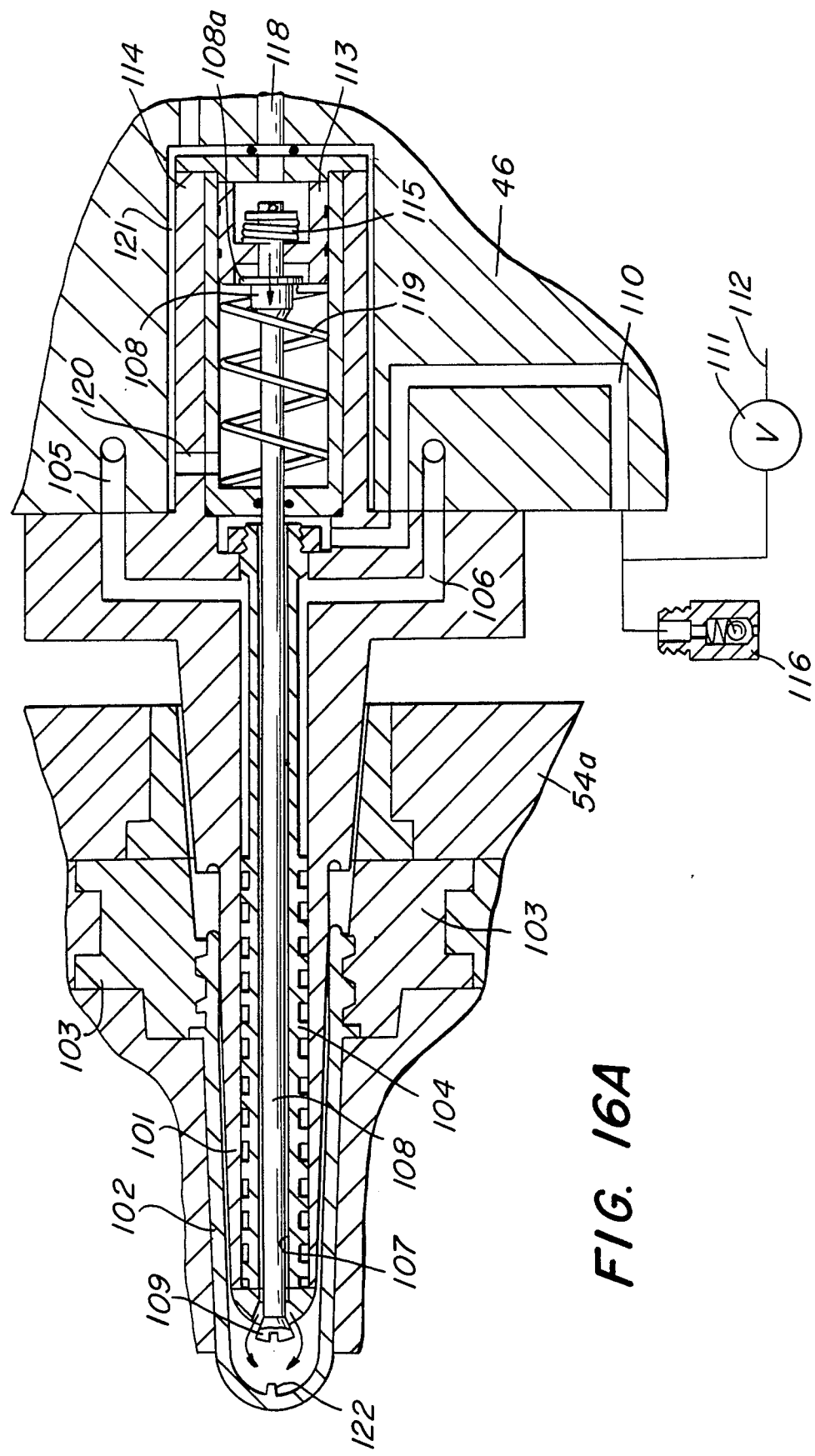
FIG. 16A is an enlarged sectional view of the core and associated parts in the position of FIG. 16.

When the core with the injection molded preform has been shifted into a position presented toward the blow molding station, as is illustrated in FIGS. 16 and 16A, various of the internal components shown in greater detail in FIG. 16A and also in FIG. 15A are utilized for various purposes described herebelow.

As in the other embodiments herein disclosed, the core is provided with a cylindrical portion adjacent the base end of the core and with a tapered portion, and means are provided in the blow molding station for shifting of the neck splits 103 axially of the core while maintaining sealing contact of the neck of the preform on the cylindrical portion of the core, as fully described above with particular reference to FIGS. 1, 2 and 3. This shifting movement is indicated in FIGS. 16 and 16A; and as in the embodiment of FIGS. 1 to 9, the sealing engagement of the neck of the preform with the cylindrical portion of the core is maintained by pressurizing the cylinders 103a in order to maintain the neck split components in engagement with each other.

This displacement of the preform in relation to the core is effected in this embodiment as in the other embodiments for the purpose of facilitating appropriate temperature control of the preform in preparation for the blow molding to be effected.

The displacement of the preform is effected in the blow molding station by actuation of the actuating rods or pins 55 which are shifted by piston devices or hydraulic actuators 56 in the manner described above with reference to FIGS. 4 to 9. Spring pressed detents 57 engaging grooves 58 serve to retain the pins 55 in shifted position. The position of the core in the blowing station is shown in FIGS. 16 and 16A. Other devices for maintaining the position of the actuating rods 55 may be employed.

Attention is now directed to the fact that the core has a central passage accommodating an internal cooling system defined by a core part 104. This component desirably provides a double spiral flow channel, the inlet end of which communicates with the supply passage 105 for the cooling medium and the outlet end of which communicates with the discharge or delivery passage 106 for the heat transfer medium, this construction being of the type more fully described above with reference to FIG. 3. The core part 104 also has a central aperture 107 defining a passage through which blowing air may be introduced into the interior of the preform when the preform is inserted into the blow mold, as described below with reference to FIGS. 18 and 18A. This central aperture 107 also accommodates the central rod indicated at 108 which is provided for several purposes. Thus the rod 108 will serve as a stretch rod in the manner described below with reference to FIGS. 18 and 18A, but it also carries a valve 109 at its tip end, this valve being associated with a valve port in the tip of the core through which blowing air from the passage 107 may be delivered into the interior of the preform.

A supply of blowing air may be introduced into the inner end of the passage 107 through a supply connection indicated at 110, which connection has a valve diagrammatically indicated at 111 associated with a pressurized blowing air supply 112. This general arrangement of central air supply and valve 109 for blow molding of the article are described above with reference to various figures illustrating the first embodiment (see particularly FIG. 3 in which the valve is indicated at 30) and also with reference to other embodiments such as shown in FIGS. 13 and 14.

The valve 109 not only is used in connection with the blow molding of the article, but that valve also serves another function. Thus in the embodiment of FIGS. 15 to 18A, the rod 108 on which the valve 109 is mounted is associated with an operating piston 113 working in a cylinder 114, a light spring 115 being arranged at the base end of the rod 108 so as to permit slight freedom for motion of the rod and the valve 109 even when the piston 113 is not actuated. When the neck split components 103 are shifted in order to shift the preform toward the free end of the core to the position shown in FIGS. 16 and 16A, and because of the maintenance of the sealing contact of the neck of the preform with the core, a vacuum or pressure reduction tends to occur within the preform at the tip and in the region where the preform is spaced from the core. The presence of the valve 109 will permit some air to enter the preform automatically upon the displacement of the preform with respect to the core, thereby avoiding tendency for vacuum to distort or partially collapse the preform. Some air may even enter the preform by leakage past a valve at the tip of the core, even where special provision for displacement of the valve and its control rod (such as the light spring 115) is not present.

Where a still larger quantity of air is desirably introduced into the tip of the preform upon shifting movement thereof with respect to the core, for instance in the manufacture of relatively large containers, provision may be made for introduction of such additional quantity of air by the employment of a check valve such as shown at 116 (see FIG. 16A) by means of which additional atmospheric air may enter into the air supply connection 110 downstream of the main blowing air control valve 111 and the passage 107 automatically by virtue of pressure reduction in the tip when the preform is displaced toward the tip of the core.

Figure 17:
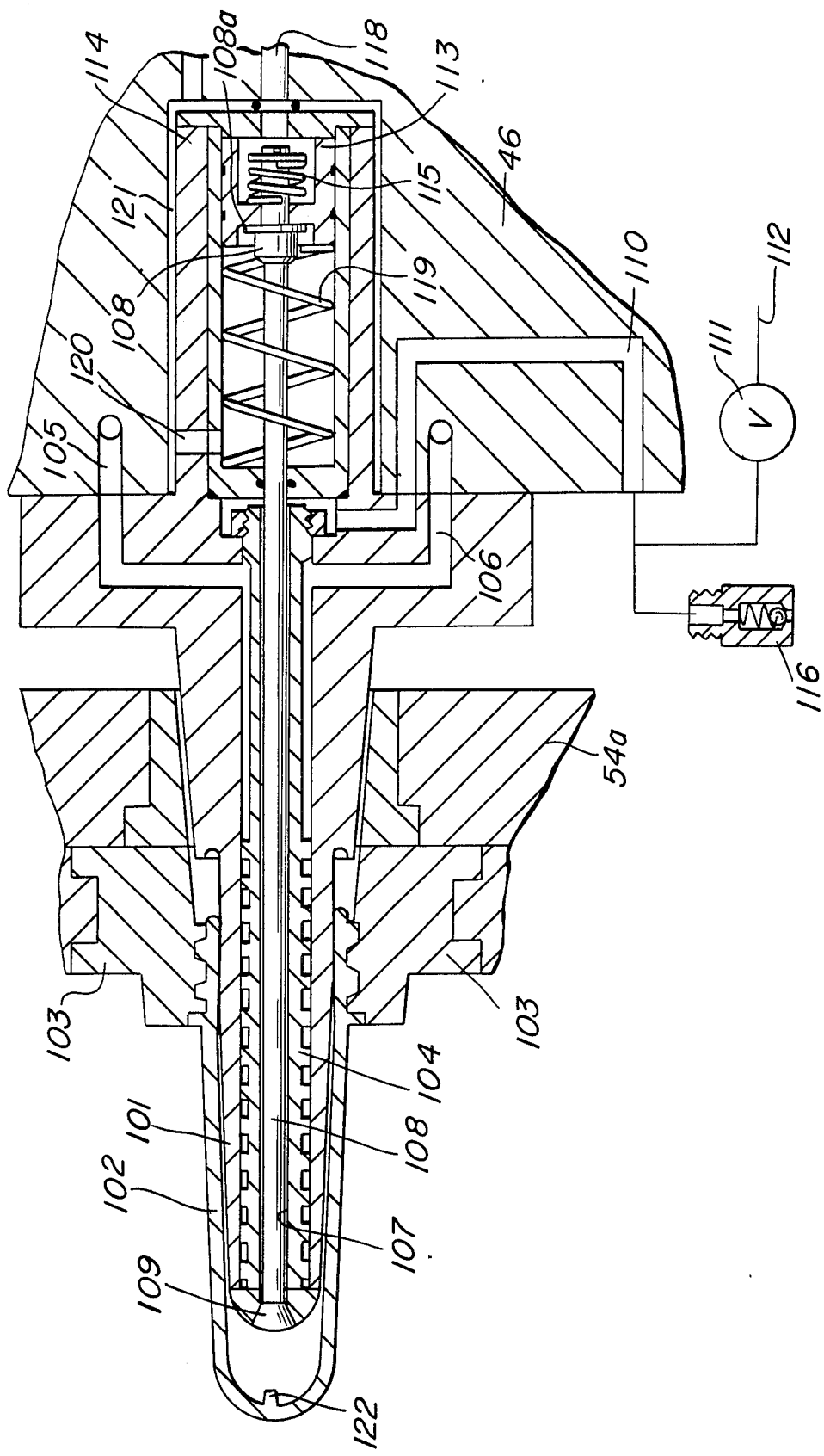

It is contemplated that temperature control be effected when the preform is separated from the core as in FIGS. 16, 16A and 17 before the blowing takes place, and for this purpose a heat transfer medium may be circulated through helical passages provided in the core part 104 by means of the inlet 105 and offtake 106.

Figure 18:
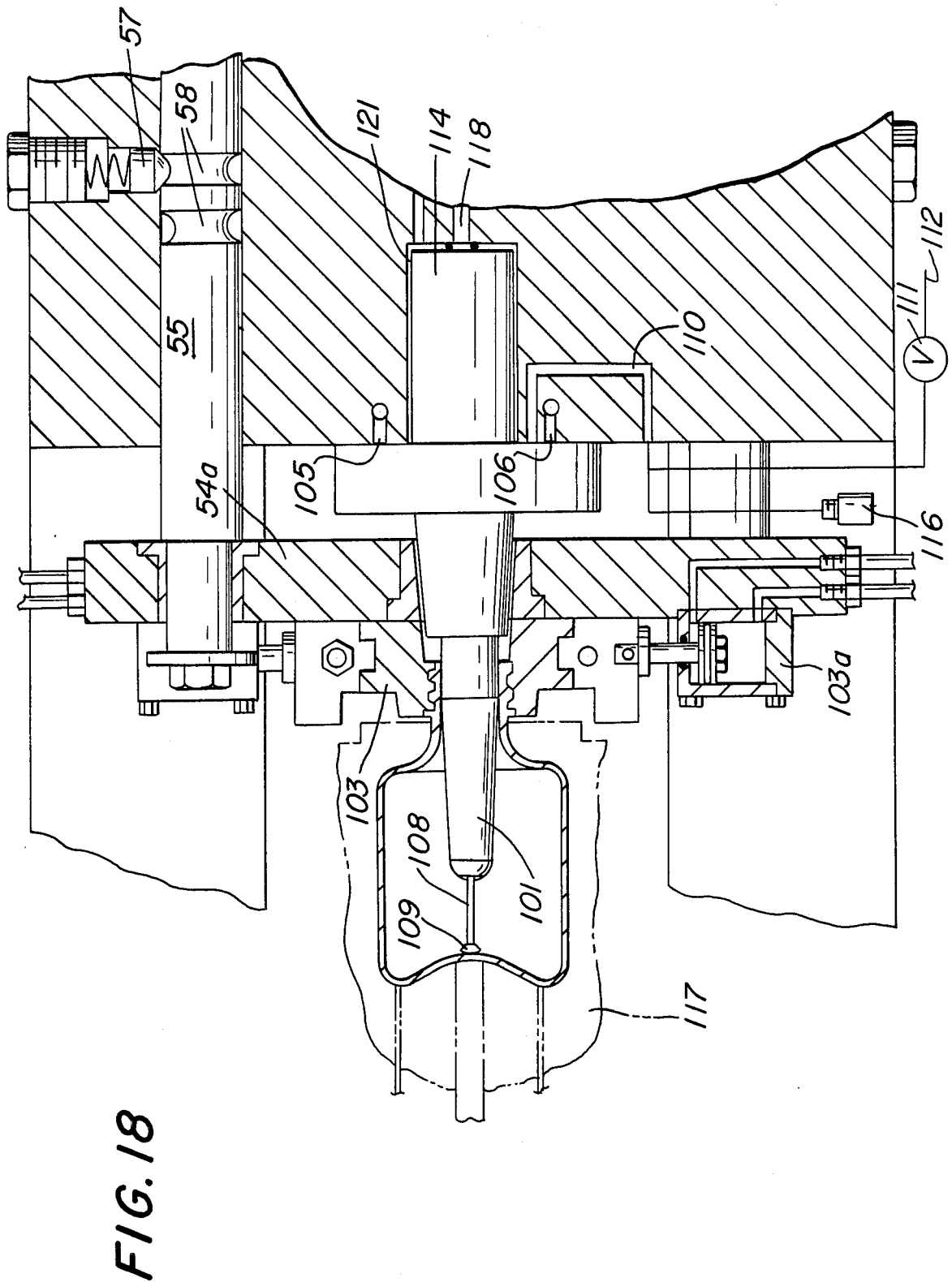
Figure 18A:
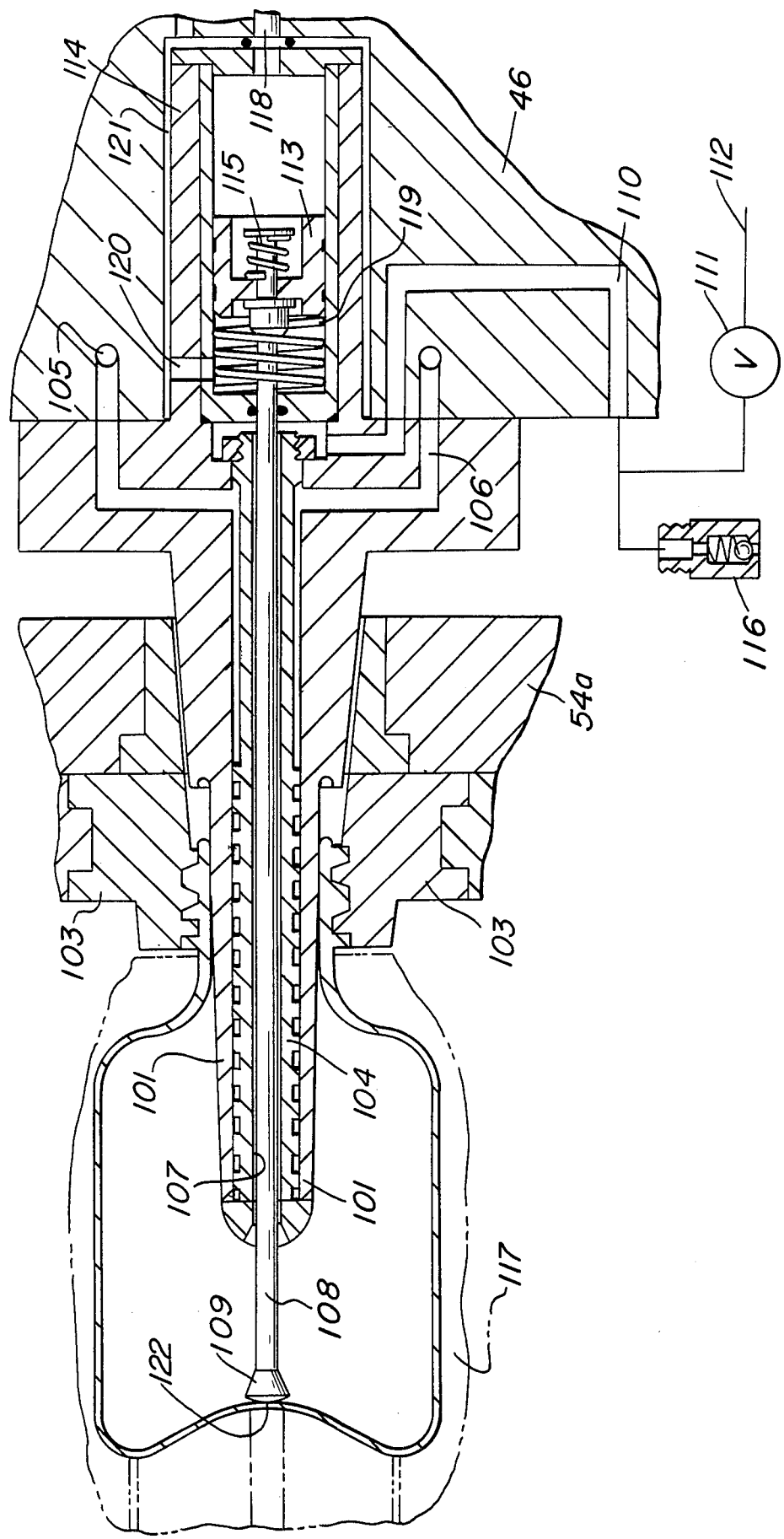

When the vacuum or pressure reduction in the tip of the preform is eliminated by virtue of the air either leaking past or introduced by partial opening of the valve 109, the light weight spring 115 will again return the valve 109 to the closed position as indicated in FIG. 17 in which the spring 115 brings the stop 108 and sealing gasket 108a into engagement with the piston 113, and this corresponds to the position of element 30 or 109 shown in FIGS. 3 and 17 respectively; and the blow molding of the preform may now be performed, as illustrated in FIGS. 18 and 18A. The blow mold itself is shown at 117 in FIGS. 18 and 18A, this mold being a split mold, as in the embodiments previously described, and it should be understood that the functioning of the parts as described above with reference to FIGS. 16, 16A and 17, may actually occur while the core and the preform thereon are positioned within a blow mold.

For the purpose of effecting blow molding of the article, the main pressure control valve 111 is opened and the blowing air is delivered through passages 110, 107 and past the valve 109 at the tip of the core. In the embodiment of FIGS. 15 to 18, it is contemplated that this introduction of the blowing air will be accompanied by introduction of air into the connection indicated at 118 behind the piston 113, thereby advancing the piston 113 and the stretch rod 108 carrying the valve 109, the piston 113 operating within the cylinder indicated at 114. This motion of the piston 113 is shown in FIG. 18A, and it will be seen from that figure that a return spring 119 reacts between the end of the cylinder 114 and the piston, so that upon exhaust of the pressure in connection 118, the spring will return the piston 113 to the base end of the cylinder, thereby bringing the stretch rod 108 and the valve 109 back to the position indicated in FIGS. 15A and 17. When the piston 113 is advanced by the pressure introduced in the connection 118, air may be exhausted through the exhaust port 120 and the connected passage 121 communicating with atmosphere. If desired, the return spring 119 may be eliminated and replaced by pressure connections providing for alternative introduction of pressure either behind the piston 113 through the connection 118, or at the outer side of the piston, in which event the exhaust passages 120 and 121 would not be needed.

The length of the stroke of the piston 113 and thus of the rod 108 is preferably established at a value which will cause the valve 109 to follow the bottom of the preform as the article is being blown, and thus assure that the bottom of the preform reaches the bottom of the blow mold. Preferably also the valve 109 is provided with a central notch or recess configured to provide a small projection 122 on the interior of the preform when the preform is being molded in the injection molding station. The interengagement of this projection 122 in the complementary recess in the outer side of the valve 109 will also aid in stabilizing the blowing operation by contributing lateral stability to the bottom of the preform as it is being blown and as it approaches the bottom wall of the blow mold.

The configuration of the blown article and the positioning of the parts at the conclusion of the blowing operation is clearly indicated in FIGS. 18 and 18A. As described above in connection with other embodiments, the blown article may be removed from the blow mold by separation of the mold halves and ejection of the article, as in FIG. 8. After the article is completed and separated, as by separation of the neck split elements 103, the neck split elements are desirably returned toward the base end of the core to the position indicated in FIGS. 15 and 15A. This is accomplished when the turret is turned to return the core to the injection station, at which time the press component identified by the numeral 45 in FIG. 4 is shifted toward the injection station thereby bringing the neck splits 103 into contact with the injection mold 52 with resultant relative shift of the neck splits 103 toward the base of the core, i.e., the position shown in FIG. 15. In this position, the interengagement of the neck splits 103 in the tapered cavity in the injection mold 52 retains the neck splits in contact with each other, as desired in the injection molding of the next preform.

In connection with the foregoing, it is noted that, as in the embodiments previously described, the neck split elements of FIGS. 15 to 18A, when in the injection molding station, are maintained in contact with each other thereby providing, in combination with the core, the desired neck cavity for the injection molding of the neck portion of another preform; and in the embodiments such as shown in FIGS. 1 to 18, when the core is moved from the injection molding station to the blow molding station, provision is made (cylinders 103a) in the blow molding station to apply sufficient pressure to the neck split elements which will retain those elements in contact with each other and thus maintain sealing contact of the preform with the cylindrical portion of the core during the blowing. This is important at the time when the blow molding is being effected, because the sealing contact is necessary in order to prevent escape of the blowing air when the blowing operation is taking place.

FIGS. 19 to 22 and Operating Features

As noted above in the sections dealing with FIGS. 1 to 18 inclusive, the split thread forming mechanism may be moved from the injection molding station to the blow molding station along with the core and the preform thereon, but as an alternative, the thread split mechanism used at the injection molding station may remain at that station while the core and the preform are moved to the injection molding station in which another neck split mechanism is provided. This latter alternative arrangement is illustrated in FIGS. 19 to 22 as described hereinafter.

Figure 19:
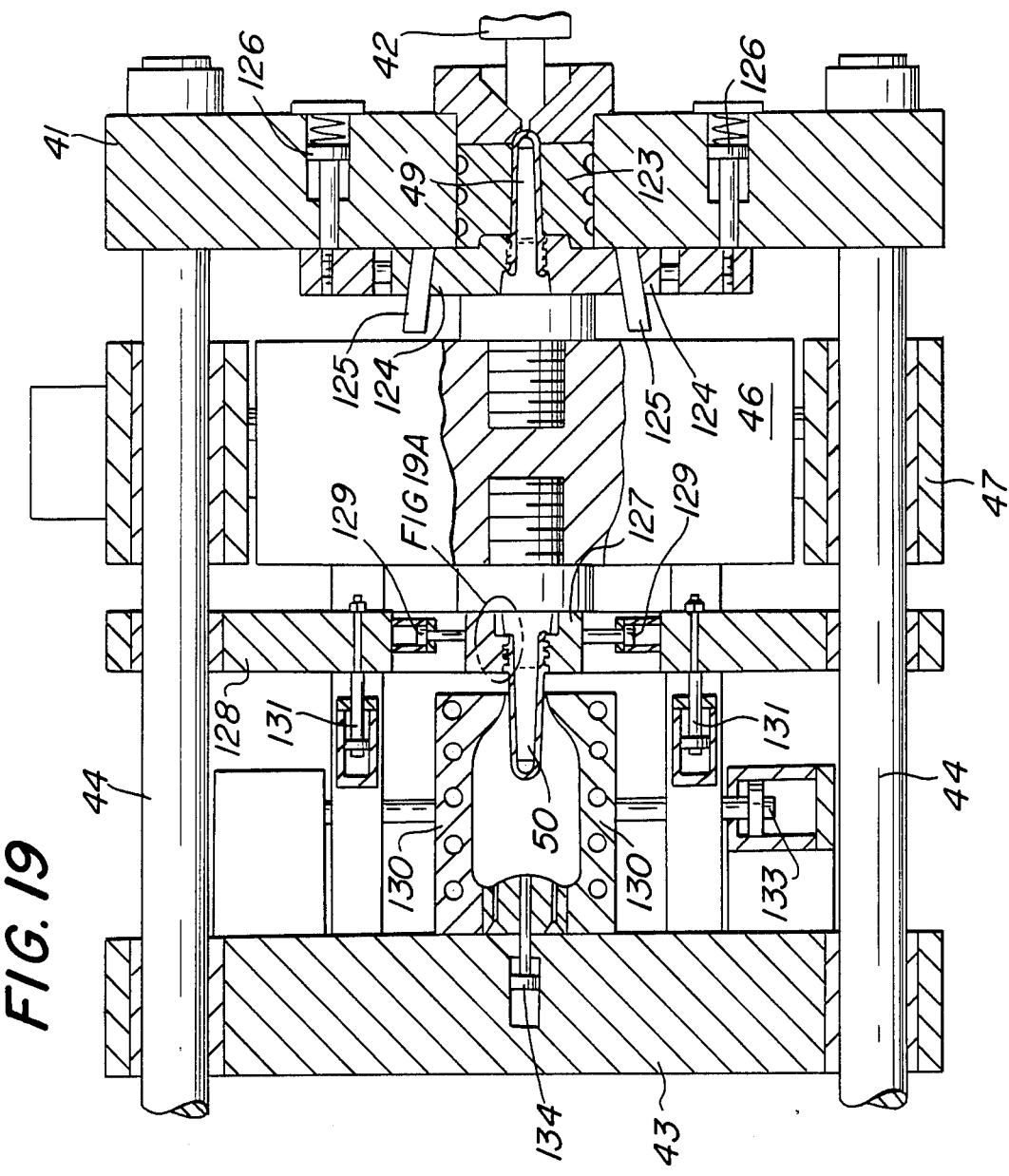
Figure 22:
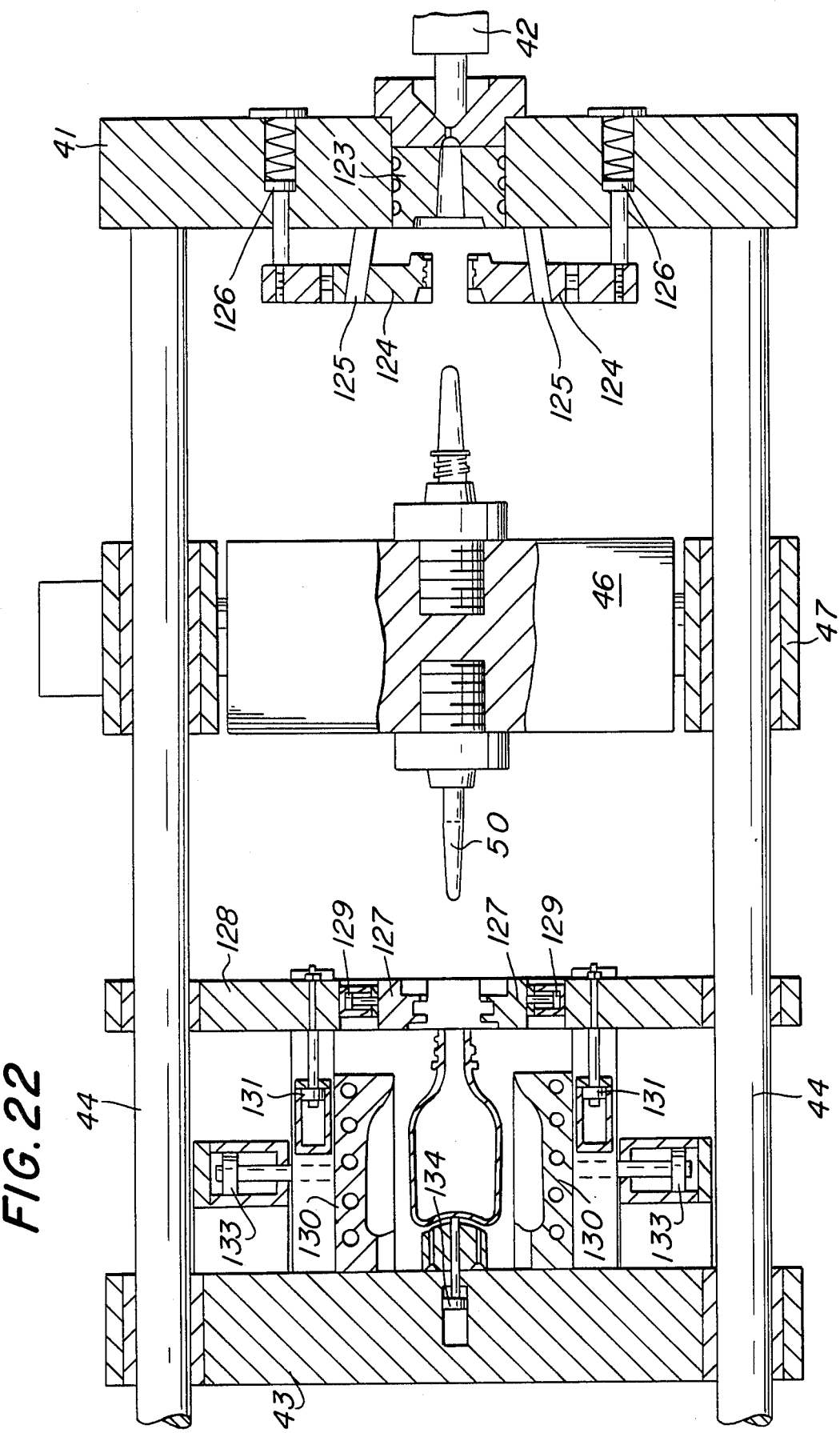

Referring now to FIG. 19, the same press components are illustrated, as described above in connection with FIGS. 4 to 9 inclusive. Briefly, these components include the fixed platen 41, the movable platen 43 and the intermediate platen 47 which carries the turret 46, these principal components of the press being mounted by means of the supports 44. As in FIGS. 4 to 9, an extruder 42 for injection of plastic is provided and a preform mold 123 is arranged to receive the plastic from the extruder 42 in the injection molding station. Cores 49 and 50 are mounted on the turret 46, the core 49 being positioned (in FIG. 19) by the turret so as to extend into the injection molding station. Neck ring split elements 124—124 are mounted on the platen 41 by means of the inclined guides 125 on which the splits may be shifted by means of cylinder devices 126, as indicated in FIG. 22. The cores 49 and 50 are of the configuration above described, namely, having a neck portion of cylindrical shape and an adjoining tapered portion, for purposes fully described above. The neck split elements 124 are provided with threaded portions adapted to cooperate with the cylindrical portion of the core in order to mold a thread on the neck of the preform.

Figure 21:
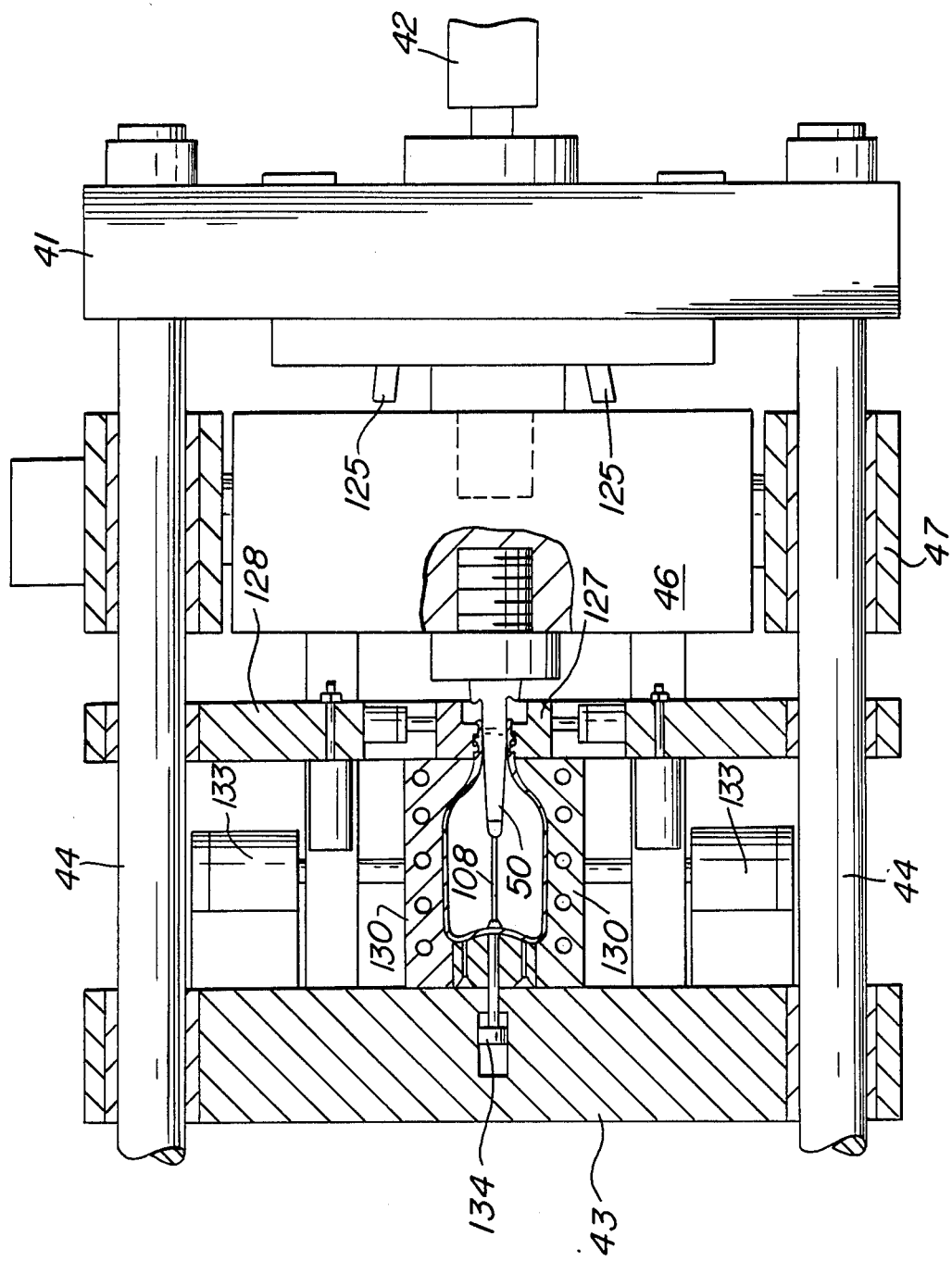

After injection molding of a preform, the neck split elements are separated as shown in FIG. 22 and the preform on the core is withdrawn by shifting movement of the platen 47 on which the turret 46 is carried (see FIG. 22). The turret 46 is then turned in order to bring the injection molded preform into the blow molding station (toward the left as viewed in FIG. 19), the core in that station being indicated in FIG. 19 by the reference numeral 50. It will be noted that when this shifting movement of the turret takes place, the neck splits 124 remain at the injection molding station. The platens are then brought together, as indicated in FIG. 20, and at this time, the neck splits 127 at the blowing station come into engagement with the neck portion of the preform as indicated in FIGS. 19, 20 and 21.

As will be seen from the drawings, the neck split elements 127 are mounted upon a movable support or platen 128, the neck split elements 127 being radially movable by means of the piston devices 129.

The blow mold parts 130—130 are mounted on the movable platen 43, and the neck split support 128 is shiftably movable with respect to the platen 43 by piston devices indicated at 131.

Figure 19A:
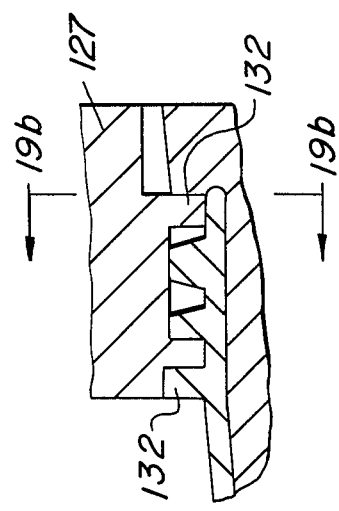
FIG. 19a is an enlarged longitudinal fragmentary sectional view of the neck split at the blowing station and illustrating the configuration of the surfaces of the split in engagement with the neck of the preform in the blowing station.
Figure 19B:
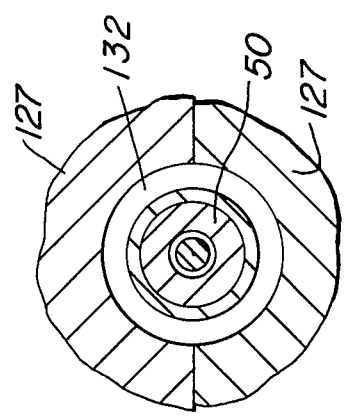

In FIG. 20, the blow mold components are shown in closed position, providing the desired blow molding cavity, and the neck split components 127 have been shifted radially inwardly to engage the neck of the article. As will be seen in the enlarged detailed FIG. 19A, the neck split elements 127 are provided with axially spaced parts 132 which are adapted to engage portions of the neck of the preform at opposite ends of the cylindrical part of the core near the base end of the core. The space between the projecting parts 132—132 accommodates the threads formed on the neck by means of the neck split elements 124—124 at the injection molding station. These parts 132—132 are shaped to engage the outer surface of the neck as the components 127—127 are brought together around the neck of the preform. Preferably, neck split elements 127—127 will abut each other when brought together substantially concurrently with the engagement of the parts 132—132 with the neck of the preform. In this way, the sealing engagement of the preform with the core is reestablished or maintained in the blow molding station, so that upon the blow molding of the article, the pressure of the blowing air will not be impaired. When the neck split elements 127 are in engagement with the neck of the preform, as shown in FIGS. 19 and 19A, the piston devices 131 are actuated so as to move the neck ring support 128 toward the blow mold, thereby shifting the preform to the position indicated in FIG. 20 in which the preform is spaced from the tip end and also from the tapered portion of the core 49. This action is desirably accomplished by the introduction of sufficient air to avoid substantial pressure reduction within the preform, in the manner fully described above with particular reference to FIGS. 15 to 18 inclusive.

It is also contemplated to employ core, stretch rod, vacuum breaking arrangements and blowing air supply and control arrangements in the embodiment of FIGS. 19 to 22 as described above and illustrated in detail in FIGS. 15 to 18.

The blowing pressure is introduced into the preform and the stretch rod 108 is advanced, as shown in FIG. 21, thereby stabilizing the blowing operation and the consequent expansion of the article within the blow mold.

The mold halves may be opened and closed by means of the piston devices 133, and after the article is blown and the core is withdrawn as indicated in FIG. 22, the mold halves may be opened in order to provide for ejection of the molded article. The ejection may be effected by a device such as the piston indicated at 134, this being preferably accomplished in the manner indicated in embodiments already described, see, for example, FIG. 8 and FIG. 13.

With regard to the embodiment shown in FIGS. 19 to 22, it is to be noted that even though the neck split elements employed at the injection molding station are retained at that station, provision is made, by employment of the neck split elements 127 at the blow molding station, for maintaining or reestablishing the sealing engagement of the neck of the article with the cylindrical portion of the core, which is of importance in maintaining the desired blowing pressure in the blow molding station.

A distinctive advantage of the arrangement of FIGS. 19 to 22 is the fact that in the blow molding station, where the neck split elements 127 are provided, those neck split elements need not have threaded interior areas, as is necessary in the injection molding station in order to produce the threads on the neck of the article. The provision of threads within the neck split components in order to mold the threads on the neck of the article represents expensive machining which is avoided in the embodiment of FIGS. 19 to 22 with respect to the neck split elements in the blow molding station.

I claim:

1. An injection blow molding press for use in making blow molded hollow articles comprising a preform core having a portion of constant cross section adjacent its base end and an adjoining tapered portion, a preform injection molding station and a blow molding station, means for mounting the core for step-wise movement to sequentially bring said core into registry with the preform injection molding station and the blow molding station, a neck ring split mounted with freedom for relative movement axially of the portion of the core of constant cross section and in a direction toward the free end of the core when the core is in registry with the blow molding station, a blow mold in the blow molding station having an open neck to receive the core with the preform thereon and also having a bottom wall, gas inlet passages in the bottom wall, a cylinder associated with the bottom wall and with which said passages communicate, an ejector pin extending through the bottom wall for ejecting the article after blow molding thereof, a piston in said cylinder and to which the ejector pin is connected, and means for introducing gas under pressure into the cylinder alternatively at opposite sides of the piston to provide alternatively for introduction of gas through said inlet passages and into contact with the exterior surface of a preform introduced into the blow mold and for shifting movement of the piston and ejector pin to eject a blown article.

2. An injection blow molding press for use in making blow molded hollow articles comprising a preform core having a portion of constant cross section adjacent its base end and an adjoining tapered portion, a preform injection molding station and a blow molding station, means for mounting the core for step-wise movement to sequentially bring said core into registry with the preform injection molding station and the blow molding station, a neck ring split mounted with freedom for relative movement axially of the portion of the core of constant cross section and in a direction to move the preform toward the free end of the core when the core is in registry with the blow molding station, a blow mold in the blow molding station having an open neck to receive the core with the preform thereon and also having a bottom wall, gas inlet passages in the bottom wall, a cylinder associated with the bottom wall and with which said passages communicate, an ejector pin extending through the bottom wall for ejecting the article after blow molding thereof, a piston in said cylinder and to which the ejector pin is connected, the piston having gas passages therethrough and the cylinder being of length sufficient to provide a stroke of the injection pin substantially corresponding to the distance between the bottom of the blow mold and the bottom of the preform before the preform is blown, and means for introducing gas under pressure into the cylinder at the side of the piston providing for shifting movement of the ejector pin into contact with the bottom of the preform when the neck ring split and the preform are moved toward the free end of the core and also providing for delivery of gas through the piston and into the blow mold through the gas inlet passages through the bottom wall of the mold.

3. Apparatus for use in making blow molded hollow articles comprising a preform core, a preform injection molding station and a blow molding station, means for mounting the core for step-wise movement to sequentially bring said core into registry with the preform injection molding station and the blow molding station, a blow mold in the blow molding station having an open neck to receive the core with the preform thereon and also having a bottom wall, a cylinder associated with the bottom wall, a centering pin extending through the bottom wall into said cylinder, a piston in said cylinder and to which said pin is connected, the cylinder being of length providing for travel of the free end of the pin between a position adjacent the bottom of the blow mold and a position in engagement with the bottom of the preform prior to blowing thereof, means for introducing gas under pressure into the cylinder at the side thereof providing for shifting movement of the pin into contact with the preform, the pin being movable toward the bottom wall of the mold when the article is blown, the centering pin having a projection on its end presented toward the bottom of the preform and adapted to project into the bottom wall of the preform and thereby center the preform when the article is blown, and further including valve means for controlling the introduction of pressurized gas into the cylinder and providing for actuation of the piston to effect centering contact of the pin with the preform prior to blowing and for actuation of the piston after blowing to effect ejection of the blown article, together with gas flow passages in the piston and in the bottom wall of the mold between the blow mold cavity and the cylinder, and thereby provide for introduction of gas into the blow mold cavity when said valve means is opened.

4. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wise angular movement to bring said cores at different times into registry with the preform injection molding station and with the blow molding station, the injection molding station having mold parts remaining at said injection molding station and including means for molding the core end portion of the preform and also including neck ring split means defining the base portion of the preform formed on a core and being openable to release the preform for transfer to the blow molding station, means for shifting the preform in a direction toward the free end of the core and thereby provide spacing between the preform and said tapered portion of the core, means at the blow molding station for establishing sealing contact of the neck of the preform with the core during blowing, and means for relatively shifting said turret and said injection molding and blowing stations and providing for entry of each core into an injection molding station and blow molding station at different times.

5. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wide angular movement to bring said cores at different times into registry with the preform injection molding station and with the blow molding station, the injection molding station having mold parts remaining at said injection molding station and including means for molding the core end portion of the preform and also including neck ring split means defining the base portion of the preform formed on a core and being openable to release the preform for transfer to the blow molding station, means for shifting the preform in a direction toward the free end of the core and thereby provide spacing between the preform and said tapered portion of the core, means for cooling the preform when the preform is spaced from the core and prior to the blowing operation, means at the blow molding station for establishing sealing contact of the neck of the preform with the core during blowing, and means for relatively shifting said turret and said injection molding and blowing stations and providing for entry of each core into an injection molding station and blow molding station at different times.

6. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wise angular movement to bring said cores at different times into registry with the preform injection molding station and with the blow molding station, the injection molding station having mold parts remaining at said injection molding station and including means for molding the core end portion of the preform and also including neck ring split means defining the base portion of the preform formed on a core and being openable to release the preform for transfer to the blow molding station, means for shifting the preform in a direction toward the free end of the core and thereby provide spacing between the preform and said tapered portion of the core, means for circulating a cooling gas over the external surface of the preform when the preform is spaced from the core and before the blowing operation, means at the blow molding station for establishing sealing contact of the neck of the preform with the core during blowing, and means for relatively shifting said turret and said injection molding and blowing stations and providing for entry of each core into an injection molding station and blow molding station at different times.

7. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wise angular movement to bring said cores at different times into registry with the preform injection molding station and with the blow molding station, neck ring split means including means adapted to engage the base portion of the preform formed on a core in the region of the portion of the core of constant cross section, means for shifting the preform in a direction toward the free end of the core and thereby displace the preform from said tapered portion of the core, means for cooling the preform when displaced from the tapered portion of the core, means at the blow molding station for establishing sealing contact of the neck of the preform with the core during blowing, means for relatively shifting said turret and said injection molding and blowing stations and providing for entry of each core into an injection molding station and blow molding station at different times, and means independent of the neck ring split means for ejecting the hollow article after blowing in the blow molding station.

8. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wise angular movement to sequentially bring said cores into registry with the preform injection molding station and the blow molding station, neck ring splits for each core positioned to cooperate with the portion thereof of constant cross section, first means for maintaining the neck ring splits in contact with each other around the core at the injection station, each neck ring split being mounted on the turret with freedom for movement axially of its associated core, means for relatively shifting said turret and said injection molding and blowing stations and providing for entry of each core sequentially into an injection molding station and a blow molding station, a mounting holder for each neck ring split, each holder being shiftably mounted on the turret and providing for shifting movement of the neck ring splits, axially of the portion of the core of constant cross section, means providing for shifting movement of the holder for each neck ring in a direction toward the base end of its associated core when the core is in the injection molding station, means mounted on the turret for shifting the holder for each neck ring split with respect to the turret to a position displaced toward the free end of its associated core after the turret is shifted to bring the core into registry with the blow molding station and thereby space the preform from the tapered portion of its core, means for circulating a cooling medium in contact with the surface of the preform when the preform is spaced from its core, and second means, independent of said first means, for maintaining the neck ring splits in contact with each other in the blow molding station to maintain sealing contact of the preform with the portion of the core of constant cross section in the blow molding station.

9. Apparatus as defined in claim 8 in which the means for circulating the cooling medium comprises means for circulating a cooling gas into contact with the exterior surface of the preform when the preform is in registry with the blow molding station.

10. Apparatus as defined in claim 8 and further including means providing for introduction of blowing gas into the preform in the blow molding station subsequent to circulation of the cooling medium.

11. Apparatus as defined in claim 8 in which the injection blow molding press develops clamp pressure by means including a fixed platen on which the preform injection station is mounted, a movable platen on which the blow molding station is mounted, and an intermediate platen on which the turret and the mounting holders for the neck ring splits are movably mounted.

12. Apparatus as defined in claim 11 in which said means providing for shifting movement of each neck ring holder provides for said shifting movement to said displaced position independently of the press clamp pressure.

13. An injection blow molding press for use in making blow molded hollow articles comprising a fixed platen against which the press clamp pressure is developed, a preform injection molding station connected with said fixed platen, a movable platen, a blow molding station mounted on said movable platen, an intermediate platen, a turret mounted on said intermediate platen with freedom for angular movement, at least two preform cores mounted on said turret and having free ends extended in opposite directions, each preform core having a portion of constant cross section adjacent its base end and an adjoining tapered portion, the turret being mounted for angular movement to sequentially bring said cores into registry with the preform injection molding station and the blow molding station, neck ring splits for each core positioned to cooperate with the portion thereof of constant cross section, first means for maintaining the neck ring splits in contact with each other around the core in the injection station, each neck ring split being mounted on the turret with freedom for movement axially of its associated core, means for relatively shifting said turret with respect to said injection molding and blowing stations and providing for entry of each core sequentially into an injection molding station and a blow molding station, a mounting holder for each neck ring split, each holder being shiftably mounted on the turret and providing for shifting movement of the neck ring splits axially of the portion of the core of constant cross section, means providing for shifting movement of the holder for each neck ring in a direction toward the base end of its associated core when the core is in the injection molding station, means mounted on the turret for shifting the holder for each neck ring split with respect to the turret to a position displaced toward the free end of its associated core after the turret is shifted to bring the core into registry with the blow molding station and thereby space the preform from the tapered portion of its core, means for bringing a cooling medium into contact with the preform when the neck ring splits are displaced toward the free end of the core, and second means, independent of said first means, for applying pressure to the neck ring splits to maintain sealing contact of the preform with the core in the blow molding station.

14. An injection blow molding press as defined in claim 13 in which said means providing for shifting movement of each neck ring holder provides for said shifting movement to said displaced position independently of the press clamp pressure against the fixed platen.

15. An injection blow molding press for use in making blow molded hollow articles comprising a preform core having a portion of constant cross section adjacent its base end, an adjoining tapered portion and a nose portion, a preform injection molding station and a blow molding station, means for mounting the core for stepwise movement to sequentially bring said core into registry with the preform injection molding station and the blow molding station, a neck ring split comprising neck split elements mounted for movement toward and away from contact with each other, the neck ring split being mounted with freedom for relative displacement axially of the portion of the core of constant cross section and in a direction toward the free end of the core when the core is in registry with the blow molding station thereby displacing the preform toward the free end of the core, first means operative at the injection molding station for holding neck split elements in contact with each other during the injection molding of the preform, and second means operative at the blow molding station for maintaining neck split elements in contact with each other and thereby maintaining sealing contact of the preform with the portion of the core of constant cross section during blowing of the preform, the tapered and nose portions of the preform core being formed of materials having different coefficients of thermal conductivity, and the material of the nose portion having a higher coefficient of thermal conductivity than the material of the tapered portion, and the press further including means for circulating a cooling medium interiorly of the core in heat exchange relation with at least the material of the nose portion of the core while same is in contact with the preform.

16. Apparatus as defined in claim 15 and further including means for circulating a cooling medium in heat exchange relation with the external surface of the preform when the preform is displaced with respect to the core in the blow molding station prior to blow molding.

17. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wise angular movement to bring said cores at different times into registry with the preform injection molding station and with the blow molding station, neck ring split means for the cores, first means operative at the injection molding station for holding neck ring split means in contact with each other during the injection molding of the preform, means shiftable axially of the core and adapted to engage the base portion of the preform formed on a core in the region of the portion of the core of constant cross section, means for shifting said shiftable means prior to the blow molding of the article in the blow molding station in a direction axially of the core toward the free end of the core and thereby provide spacing between the preform and said tapered portion of the core, means for circulating a cooling medium in contact with the outside surface of the preform when the preform is spaced from the core, second means operative at the blow molding station after said axial shifting movement of the neck ring split means toward the free end of the core for maintaining sealing contact of the neck of the preform with the core in the region of the portion of the core of constant cross section during blowing, and means for relatively shifting said turret and said injection molding and blowing stations and providing for entry of each core into an injection molding station and a blow molding station at different times.

18. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, the preform injection molding station including means for forming a preform having an open end with portions of different outside diameters axially spaced from the end opening in the preform in the region of constant diameter of the core, mounting means for said cores, said mounting means providing for step-wise angular movement to bring each one of said cores at different times into registry with the preform injection molding station and the blow molding station, neck ring split means for the cores, first means operative at the injection molding station for holding neck ring split means in contact with each other during the injection molding of the preform, means shiftable axially of the core and adapted to interengage with portions of the preform of different outside diameters in the region of the portion of the core of constant cross section, means operative at the blow molding station for shifting said shiftable means prior to the blow molding of the article in the blow molding station in a direction toward the free end of the core and thereby shifting the preform toward the free end of the core to provide spacing between the preform and said tapered portion of the core and second means operative at the blow molding station after said shifting to maintain sealing contact between the preform and the portion of the core of constant cross section during blowing, means for circulating a cooling medium in contact with the preform when the preform is spaced from the tapered portion of the core, and means for relatively shifting said mounting means for the cores and said injection molding and blowing stations and providing for entry of each core into an injection molding station and a blow molding station at different times.

19. An injection blow molding press for use in making blow molded hollow articles having a neck with a neck opening, comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wise angular movement to bring each of said cores at different times into registry with the preform injection molding station and the blow molding station, neck ring split means for the cores including neck engaging elements relatively movable into and out of contact with each other in a direction radially toward and away from the outside of the neck of the article being formed, first means operative at the injection molding station to hold the neck engaging elements in contact with each other during injection molding of the preform, the neck ring split means being mounted with freedom for movement axially of the core in the blow molding station to provide for shifting movement of the neck ring split means in a direction toward the free end of the core and being configured to move the preform toward the free end of the core and thereby space the preform from the tapered portion of the core, means at the blow molding station for shifting the neck ring split means in a direction toward the free end of the core, means for circulating a cooling medium in contact with the preform when the preform is spaced from the core, the neck ring split means including second means operative at the blow molding station to urge the neck engaging elements into engagement with each other to maintain sealing contact of the preform against the portion of the core of constant cross section during blowing of the hollow article, and means for relatively shifting said turret and said injection molding and blowing stations and providing for entry of each core into an injection molding station and a blow molding station at different times.

20. An injection blow molding press for use in making blow molded hollow articles, comprising at least two preform cores having free ends extended in different directions from each other and each having a portion of constant cross section adjacent its base end and an adjoining tapered portion, a preform injection molding station and a blow molding station positioned to cooperate with cores extended in said different directions, the preform injection molding station including means for forming a preform having a neck with an open end with a portion of reduced outside diameter axially spaced from the end opening in the preform in the region of constant diameter of the core, mounting means for said cores, said mounting means providing for step-wise angular movement to bring each of said cores at different times into registry with the preform injection molding station and the blow molding station, means at the blow molding station for shifting the preform on the core prior to the blow molding of the article in the blow molding station to a position displaced toward the free end of the core and thereby provide spacing between the preform and said tapered portion of the core, neck ring split means for the cores including neck engaging elements relatively movable into and out of contact with each other in a direction radially toward and away from the outside of the said portion of the neck of the preform of reduced diameter, first means, operative in the injection molding station, for maintaining neck ring elements in contact with each other around the core, second means, independent of said first means, operative in the blow molding station, for urging said elements into engagement with each other to maintain sealing contact of the preform against the portion of the core of constant cross section, means at the blow molding station for cooling the preform in said displaced position before the blowing operation, and means for relatively shifting said mounting means and said injection molding and blowing stations and providing for entry of each core into an injection molding station and a blow molding station at different times.

21. An injection blow molding press for use in making blow molded hollow articles having a neck with a neck opening, comprising at least one preform core having a free end and having a portion of constant cross section adjacent its base end and an adjoining tapered portion, a preform injection molding station and a blow molding station, means mounting the core for stepwise movement to bring said core at different times into registry with the preform injection molding station and the blow molding station, neck ring split means including elements surrounding the portion of the core of constant cross section and relatively movable in a direction radially toward and away from the outside of the neck of the article being formed, first means, operative in the injection molding station, for maintaining neck engaging elements in contact with each other around the core, and means associated with the split means for shifting the preform on the core prior to the blow molding of the article in the blow molding station in a direction toward the free end of the core and thereby providing a space between the preform and said tapered portion of the core, means for admitting air into said space between the preform and the core during shifting of the preform and thereby avoid development of appreciable vacuum in said space, means for subsequently introducing blowing air into said space to develop pressure sufficient to blow mold the article, and second means operatively associated with neck ring elements at the blow molding station and providing for maintenance of sealing contact of the preform against the portion of the core of constant cross section during the introduction of the blowing air to blow mold the article.

22. A construction, as defined in claim 21, in which the neck ring split means comprises a pair of neck ring split elements movable with the core between the injection and blow molding stations.

23. A construction, as defined in claim 21, in which the neck ring split means comprises two pairs of neck ring split elements, one pair being located in the injection molding station and the other pair being located in the blow molding station.

24. An injection blow molding press for use in making blow molded hollow articles comprising at least two preform cores having free ends extended in different directions from each other and each having a portion of constant cross section adjacent its base end and an adjoining tapered portion, a preform injection molding station and a blow molding station positioned to cooperate with cores extended in said different directions, a turret for mounting said cores, the turret being mounted for step-wise angular movement to sequentially bring said cores into registry with the preform injection molding station and the blow molding station, a neck ring split including neck split elements positioned to cooperate with the portion of the core of constant cross section, first means at the injection molding station for holding said elements in contact with each other during the injection molding operation, the neck ring split being mounted with freedom for movement axially of the core in the blow molding station to provide for shifting movement of the neck ring split in a direction toward the free end of the core and being configured to move the preform toward the free end of the core and thereby space the preform from the tapered portion of the core, means for blowing the hollow article in the blowing station including a passage extended through the core for supplying blowing gas, a valve in said passage at the tip of each core, said valve providing for introduction of air into the space between the preform and the core when the preform is being shifted with relation to the core and thereby avoid development of appreciable vacuum in said space, means for subsequently admitting blowing air for blowing the article, and second means operative at the blow molding station for urging neck split elements toward each other in the blow molding station to maintain sealing contact of the preform with the portion of the core of constant cross section during the blowing operation.

25. A construction, as defined in claim 24, and further including a stretch rod mounted in each core and connected with said valve, and means for projecting the stretch rod from the tip of the core and thereby opening said valve to admit blowing air and concurrently engaging and guiding the tip of the preform during blowing in the blow molding station.

26. A construction, as defined in claim 25, and further including a piston and cylinder device at the base of the core, the piston being connected with the stretch rod, and controllable means for introducing operating fluid into said cylinder to effect projection of the stretch rod and guiding of the tip of the preform during blowing.

27. Blow molding equipment for one in making blow molded hollow articles having a neck with a neck opening, comprising at least one preform core having a free end and having a portion of constant cross section and an adjoining tapered portion, an injection station for forming a preform on said core, neck ring split means including neck engaging elements surrounding the portion of the core of constant cross section, said elements being radially movable toward and away from each other, first means at the injection station for urging neck engaging elements toward each other during injection, a blow molding station including a blow mold, means for brining the core with a preform thereon into registry with the blow molding station, second means for urging neck ring elements toward each other in the blow molding station to maintain sealing engagement of the preform with the portion of the core of constant cross section during blowing, the neck ring split means being movable in a direction toward the free end of the core and having means interengaged with the preform and providing for axial movement of the preform with the neck ring split means and thereby effect separation of the preform from said tapered portion of the core, means operative at the blow molding station for moving the neck ring split means in the direction to separate the preform from the tapered portion of the core, means for admitting air between the preform and the core during the separation thereof and thereby avoid developement of appreciable vacuum between the preform and the core, and means for introducing blowing air through the core into the preform after separation of the preform from the core.

28. A construction, as defined in claim 27, in which the means for admitting air between the core and preform to avoid development of vacuum comprises passage means extended through the core to a zone at atmospheric pressure, and a one-way valve positioned to admit atmospheric air into said passage means.

29. A construction, as defined in claim 27, in which the core has a passage therein with an opening to the interior of the preform, a supply line for the blowing air connected with said passage in the core, a control valve in said supply line, and a one-way check valve connected with said supply line downstream of the control valve, the check valve being positioned to admit atmospheric air into said supply line when the control valve is closed.

30. A construction, as defined in claim 29, and further including a stretch rod extended through the passage in the core and shiftably movable with an end in contact with the bottom wall of the article being blown, the stretch rod carrying a plug valve for said passage adjacent the free end of the core, mechanism for actuating said stretch rod including a controllable piston operative to open said plug valve and advance the stretch rod as the article is blown, the stretch rod being connected with said piston with freedom for limit motion with respect to the piston in the direction to open said plug valve, and a low pressure spring resisting said limited motion.

31. A construction as defined in claim 27 in which the means on the neck ring interengaged with the preform comprises thread elements.

32. A construction as defined in claim 27 in which the means on the neck ring interengaged with the preform comprises a circumferential flange element.

33. An injection blow molding press for use in making blow molded hollow articles having a neck with a neck opening, comprising at least one preform core having a free end and having a portion of constant cross section adjacent its base end and an adjoining tapered portion, a preform injection molding station and a blow molding station, means for mounting the core for stepwise movement to bring said core at different times into positions presented toward the preform injection molding station and the blow molding station, and neck ring split means for the core including neck engaging elements relatively movable in a direction radially toward and away from the outside of the neck of the article being formed, characterized by means for shifting the preform on the core when the core is presented toward the blow molding station prior to the blow molding of the article, said shifting being in a direction toward the free end of the core and thereby provide spacing between the preform and said tapered portion of the core prior to blow molding, first means, operative in the injection molding station, for maintaining neck engaging elements in contact with each other around the core, and second means, independent of said first means, operative in the blow molding station for urging neck engaging elements into engagement with each other to maintain sealing contact of the preform against the portion of the core of constant cross section.

* * * * *